US012601957B2

(12) United States Patent
An et al.

(10) Patent No.: US 12,601,957 B2
(45) Date of Patent: Apr. 14, 2026

(54) IMAGE SHAKE CORRECTING MODULE

(71) Applicant: OPTRONTEC CO., LTD., Changwon-si (KR)

(72) Inventors: Sang Min An, Seoul (KR); Dae Hyun Jeong, Seoul (KR); Dong Rack Lee, Seoul (KR); Sung Wook So, Hwaseong-si (KR); Hyun Jung Park, Seoul (KR)

(73) Assignee: OPTRONTEC CO., LTD., Changwon-si (KR)

( * ) Notice: Subject to any disclaimer, the term of this patent is extended or adjusted under 35 U.S.C. 154(b) by 372 days.

(21) Appl. No.: 18/474,246

(22) Filed: Sep. 26, 2023

(65) Prior Publication Data

US 2024/0337900 A1 Oct. 10, 2024

(30) Foreign Application Priority Data

Apr. 6, 2023 (KR) ........................ 10-2023-0045356

(51) Int. Cl.
*G03B 5/04* (2021.01)

(52) U.S. Cl.
CPC ........ *G03B 5/04* (2013.01); *G03B 2205/0015* (2013.01); *G03B 2205/0069* (2013.01)

(58) Field of Classification Search
CPC ... G03B 5/04; G03B 5/02; G03B 5/00; G03B 2205/0015; G03B 2205/0069; G03B 2205/0007; G02B 27/646; G02B 27/64
USPC .......................................................... 359/557
See application file for complete search history.

(56) References Cited

U.S. PATENT DOCUMENTS

| | | | | |
|---|---|---|---|---|
| 5,680,251 A * | 10/1997 | Kato | G02B 27/646 359/557 |
| 2018/0284569 A1 | 10/2018 | Minamisawa et al. | |
| 2021/0247663 A1* | 8/2021 | Lee | G02B 7/09 |
| 2022/0155652 A1* | 5/2022 | Seo | G02B 7/02 |
| 2023/0213781 A1* | 7/2023 | Park | H02K 41/0356 359/557 |
| 2024/0040253 A1* | 2/2024 | Min | G03B 30/00 |
| 2024/0069356 A1* | 2/2024 | Han | G02B 27/646 |
| 2024/0134249 A1* | 4/2024 | Kim | H04N 23/687 |
| 2024/0276088 A1* | 8/2024 | Wei | G03B 5/02 |

(Continued)

FOREIGN PATENT DOCUMENTS

| | | |
|---|---|---|
| KR | 10-2017-0004872 A | 1/2017 |
| KR | 10-2022-0035622 A | 3/2022 |
| KR | 10-2022-0068098 A | 5/2022 |

*Primary Examiner* — Bumsuk Won
*Assistant Examiner* — Seth D Moser
(74) *Attorney, Agent, or Firm* — WTA IP Law P.C.

(57) ABSTRACT

Disclosed herein is an image shake correcting module. The image shake correcting module includes an optical module, a first holder, a first drive unit, a second holder, a second drive unit, a third holder, a housing, an outer cover, and a substrate. The optical module may be mounted in an inner space of the first holder. The first drive unit may include a first drive ball, a first magnet and a first coil for primary driving of the first holder. The first holder may be mounted in an inner space of the second holder. The second drive unit may include a second drive ball, a second magnet, and a second coil for secondary driving of the second holder. The second holder may be mounted in an inner space of the third holder. The third holder may be mounted in an inner space of the housing.

27 Claims, 20 Drawing Sheets

(56) References Cited

U.S. PATENT DOCUMENTS

| | | | | |
|---|---|---|---|---|
| 2025/0208483 | A1* | 6/2025 | Rho | G03B 3/10 |
| 2026/0029687 | A1* | 1/2026 | Lee | G03B 13/36 |

* cited by examiner $$1801 \begin{cases} 1802 \\ 1803 \\ 1804 \end{cases} \quad 180 \begin{cases} 1801 \\ 1805 \end{cases}$$

$$1703 \begin{cases} 1704 \\ 1705 \\ 1706 \end{cases} \quad 1702 \begin{cases} 1703 \\ 1707 \end{cases}$$

IMAGE SHAKE CORRECTING MODULE

CROSS-REFERENCE TO RELATED APPLICATIONS

This application claims priority under 35 U.S.C. § 119(a) to Republic of Korea patent application no. 10-2023-0045356, filed on Apr. 6, 2023, which is incorporated by reference herein in its entirety.

TECHNICAL FIELD

The present invention relates to an image shake correcting module.

BACKGROUND

In recent years, camera modules are fundamentally adopted by portable electronic devices, such as smartphones, tablets, notebook computers, and the like, and include an autofocus function, an image stabilization function, a zoom function, and the like.

In general, camera modules used in portable electronics are becoming higher resolution, miniaturized, and light-weight. A camera module with higher resolution is more sensitive, causing image distortion. Therefore, the camera modules require image shake correction function in order to capture a clear image of a subject.

SUMMARY

Embodiments of the present invention are conceived to solve such problems in the art and it is an aspect of the present invention to provide an image shake correcting module that achieves reduction in thickness thereof.

In accordance with one embodiment of the present invention, there is provided an image shake correcting module including: an optical module; a first holder having the optical module mounted therein; a first drive unit including a first drive ball, a first magnet and a first coil for primary driving of the first holder; a second holder having the first holder mounted therein; a second drive unit including a second drive ball, a second magnet, and a second coil for secondary driving of the second holder; a third holder having the second holder mounted therein; a housing having the third holder mounted therein; an outer cover covering at least an upper portion of the housing and having an opening through which the optical module passes; and a substrate disposed on the housing and supplying electric current to the first coil and the second coil. Here, the primary driving may include movement of the first holder in one horizontal direction. The secondary driving may include movement of the second holder in another horizontal direction perpendicular to the one horizontal direction. In addition, the first drive ball may be placed at one side of the first holder and the second drive ball may be placed at the other side of the first holder.

The first drive ball may be placed between the first holder and the second holder.

The second drive ball may be placed between the second holder and the third holder.

The first drive ball and the second drive ball may be placed on the same horizontal surface.

The first drive ball may be moved in the same horizontal direction as the first holder and the second drive ball may be moved in the same horizontal direction as the second holder.

The first drive unit may include: the first magnet mounted on an outer surface of a first side surface of the first holder; the first coil mounted on the substrate to face the first magnet; and the first drive ball disposed between a second side surface of the first holder and a second side surface of the second holder. The first side surface of the first holder may be perpendicular to the second side surface of the first holder. In addition, the second side surface of the first holder may face the second side surface of the second holder.

The first holder may further include a first drive guide having an elongated groove shape formed on the second side surface of the first holder in the horizontal direction. Here, the first drive ball may be mounted on the first drive guide to rotate and move along the first drive guide.

The first holder may be formed on the second side surface thereof with two first drive guides spaced apart from each other and parallel to each other in the horizontal direction. In addition, each of the two first drive guides may be provided with the first drive ball.

The image shake correcting module may further include a first drive ball cage provided at opposite ends thereof with the two first drive balls, respectively. Here, the first drive balls may rotate and move in a state of being fitted into the first drive ball cage.

The second drive unit may include: the second magnet mounted on an outer surface of a second side surface of the second holder; the second coil mounted on the substrate to face the second magnet; and the second drive ball disposed between a third side surface of the second holder and a third side surface of the third holder. The second side surface of the second holder may be perpendicular to the third side surface of the second holder. In addition, the third side surface of the second holder may face the third side surface of the third holder.

The second holder may further include a second drive guide having an elongated groove shape formed on the third side surface of the second holder in the horizontal direction. Here, the second drive ball may be mounted on the second drive guide to rotate and move along the second drive guide.

The second holder may be formed on the third side surface thereof with two second drive guides spaced apart from each other and parallel to each other in the horizontal direction. In addition, each of the two second drive guides may be provided with the second drive ball.

The image shake correcting module may further include a second drive ball cage provided at opposite ends thereof with the two second drive balls, respectively. Here, the second drive balls may rotate and move in a state of being fitted into the second drive ball cage.

The image shake correcting module may further include a first securing plate disposed on the second side surface of the first holder. The first securing plate and the second magnet may face each other, with the second holder placed therebetween. Here, attractive force may be generated between the first securing plate and the second magnet.

The image shake correcting module may further include a third drive unit including a third drive ball, a third magnet, and a third coil for tertiary driving of the third holder. Here, the tertiary driving may include movement of the third holder in a vertical direction.

The third drive unit may include: the third magnet mounted on an outer surface of a third side surface of the third holder; the third coil mounted on the substrate to face the third magnet; and the third drive ball disposed between the third holder and the housing. Here, the third drive ball may rotate while moving in the vertical direction.

The third holder may further include a third drive guide having an elongated groove shape formed on the third side surface of the third holder in the vertical direction. Here, the third drive ball may be mounted on the third drive guide to rotate and move along the third drive guide.

The third holder may be formed on the third side surface thereof with two third drive guides spaced apart from each other in the horizontal direction. Here, each of the two third drive guides may be provided with the third drive ball.

The image shake correcting module may further include a second securing plate disposed on the third side surface of the second holder. The second securing plate and the third magnet may face each other, with the third holder placed therebetween. Here, attractive force may be generated between the second securing plate and the third magnet.

The optical module may be moved corresponding to movement of the first holder.

The first holder and the optical module may be moved corresponding to movement of the second holder.

The first holder, the second holder and the optical module may be moved corresponding to movement of the third holder.

The image shake correcting module may further include assistant balls disposed between the first holder and the second holder and between the second holder and the third holder.

The image shake correcting module may further include an assistant ball-insertion portion into which the assistant balls are inserted.

The assistant ball-insertion portion may have a structure in which a vertical groove open at an upper portion thereof and formed in the vertical direction is connected to a horizontal groove formed at a lower end of the vertical groove in the horizontal direction.

The assistant balls may be inserted into the assistant ball-insertion portion through the vertical groove to be mounted on the horizontal groove.

The assistant ball-insertion portion may include: a first assistant ball-insertion portion formed on an outer surface of the first holder; a second-1 ball-insertion portion formed on an inner surface of the second holder to face the first assistant ball-insertion portion; a second-2 assistant ball-insertion portion formed on an outer surface of the second holder; and a third assistant ball-insertion portion formed on an inner surface of the third holder to face the second-2 assistant ball-insertion portion.

The image shake correcting module according to the embodiments of the present invention has a structure in which drive balls for correction of image shake in one direction and drive balls for correction of image shake in another direction are disposed on a horizontal surface, instead of a stack structure of the balls, thereby achieving reduction in overall thickness thereof. Accordingly, the image shake correcting module according to the embodiments of the present invention can reduce not only the thickness thereof but also the thickness of a device adopting the image shake correcting module.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION

Figure 1:
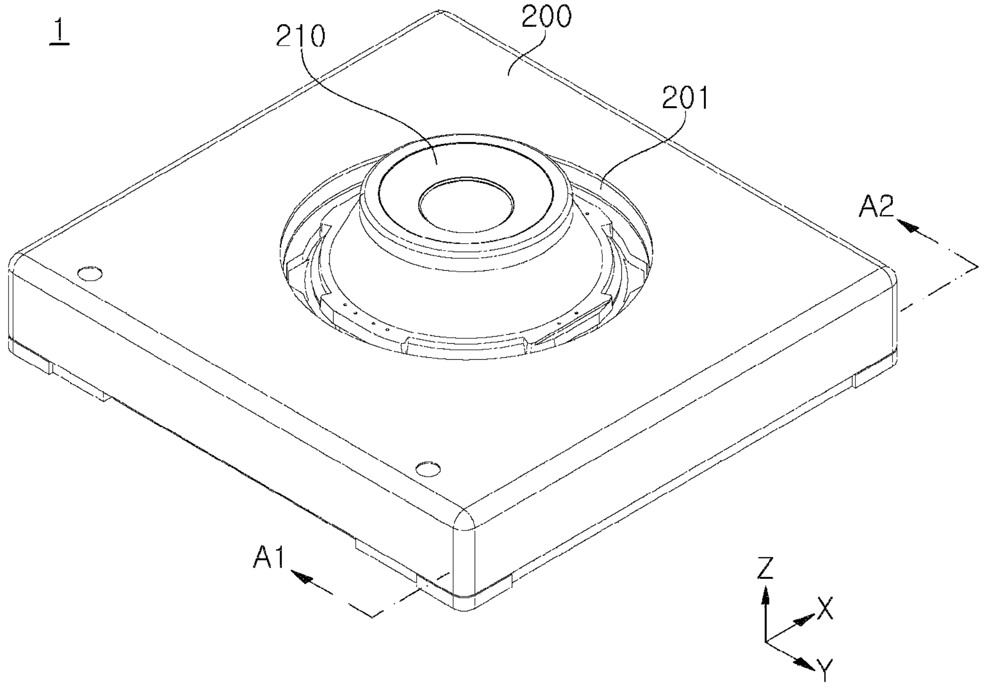
FIG. 1 is an assembly view of an image shake correcting module according to a first embodiment of the present invention.

Hereinafter, exemplary embodiments of the present invention will be described with reference to the accompanying drawings. The following embodiments are provided for complete disclosure and thorough understanding of the present invention by those skilled in the art. Therefore, it should be understood that the present invention is not limited thereto and may be embodied in different ways. In addition, it should be understood that the drawings are not to precise scale and some of the dimensions, such as width, length, thickness, and the like, are exaggerated for clarity of description. Like elements are denoted by like reference numerals throughout the specification and the accompanying drawings.

Hereinafter, an image shake correcting module according to the present invention will be described with reference to the accompanying drawings.

FIG. 1 to FIG. 13 are views of an image shake correcting module according to a first embodiment of the present invention.

Figure 2:
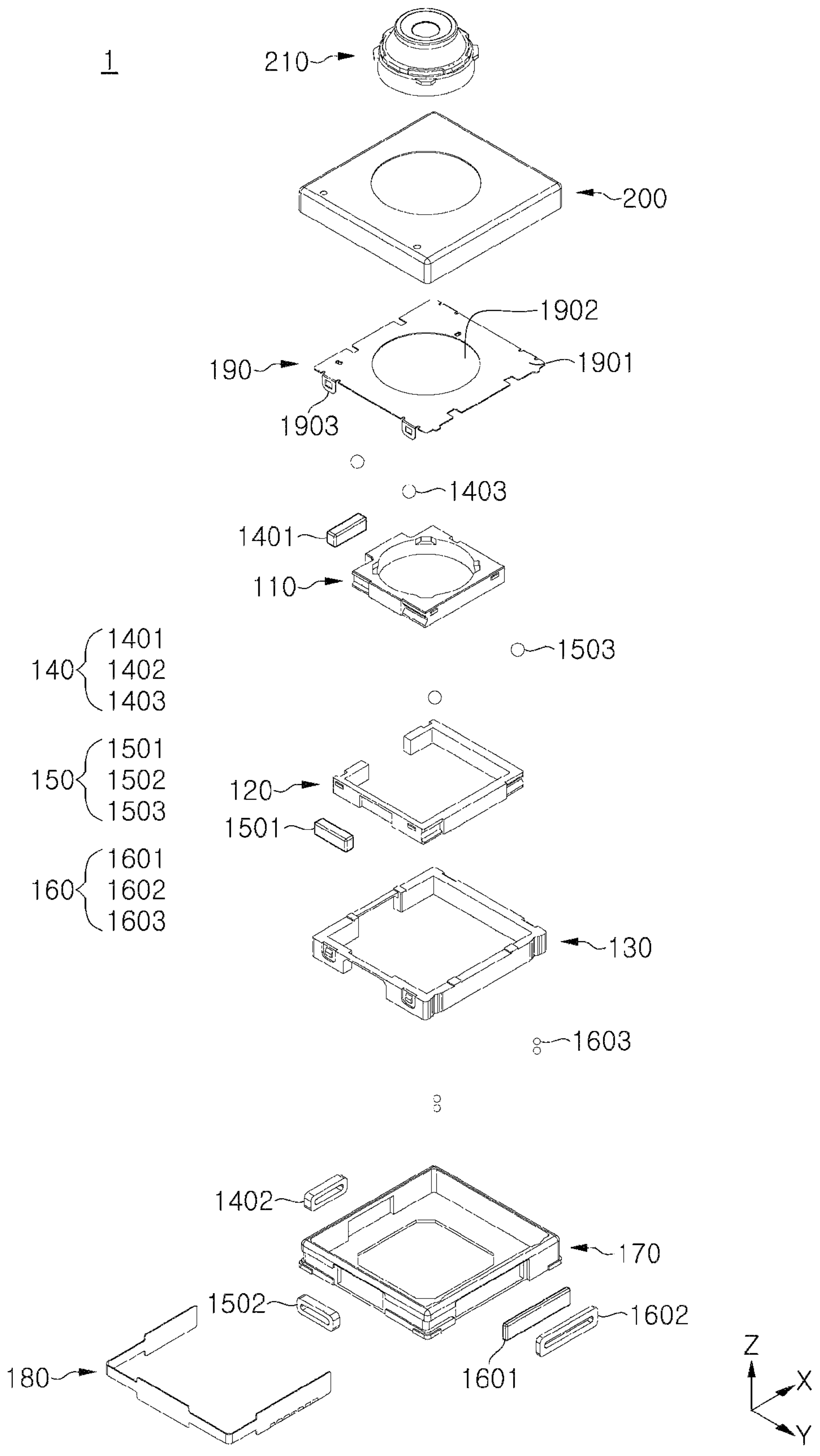
FIG. 2 is an exploded perspective view of the image shake correcting module according to the first embodiment of the present invention.
Figure 3:
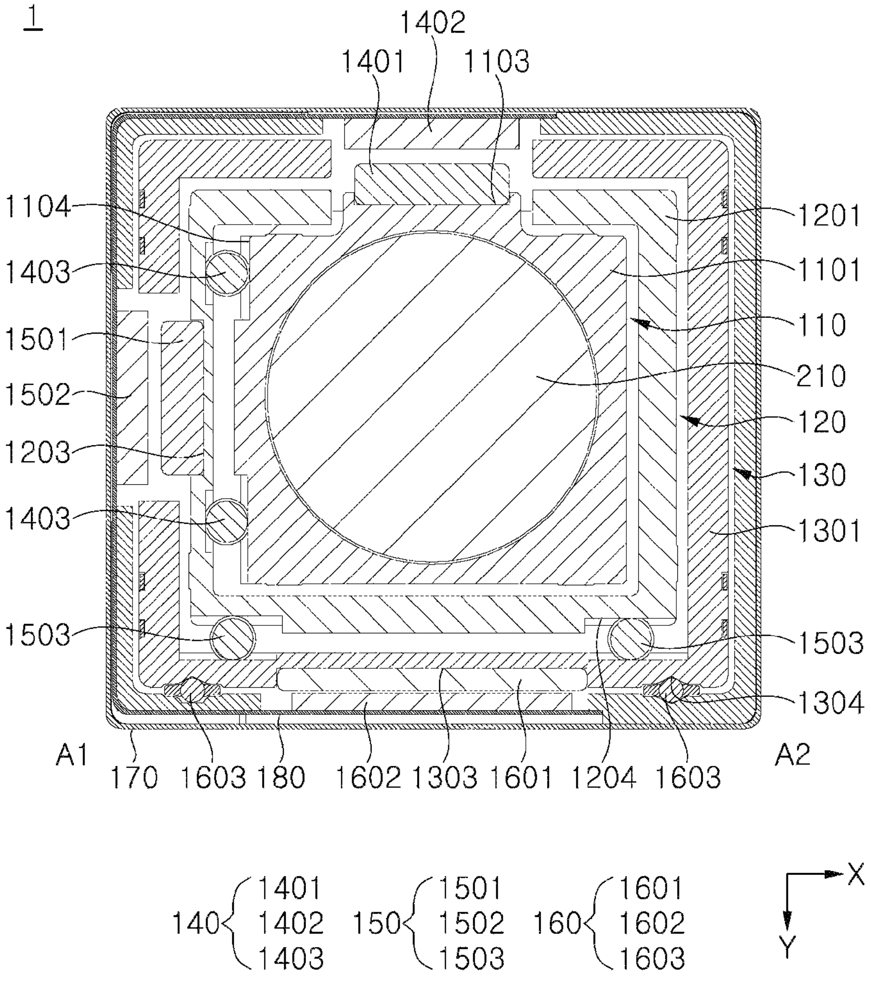
FIG. 3 is a first cross-sectional view (A1-A2) of the image shake correcting module according to the first embodiment of the present invention.
Figure 4:
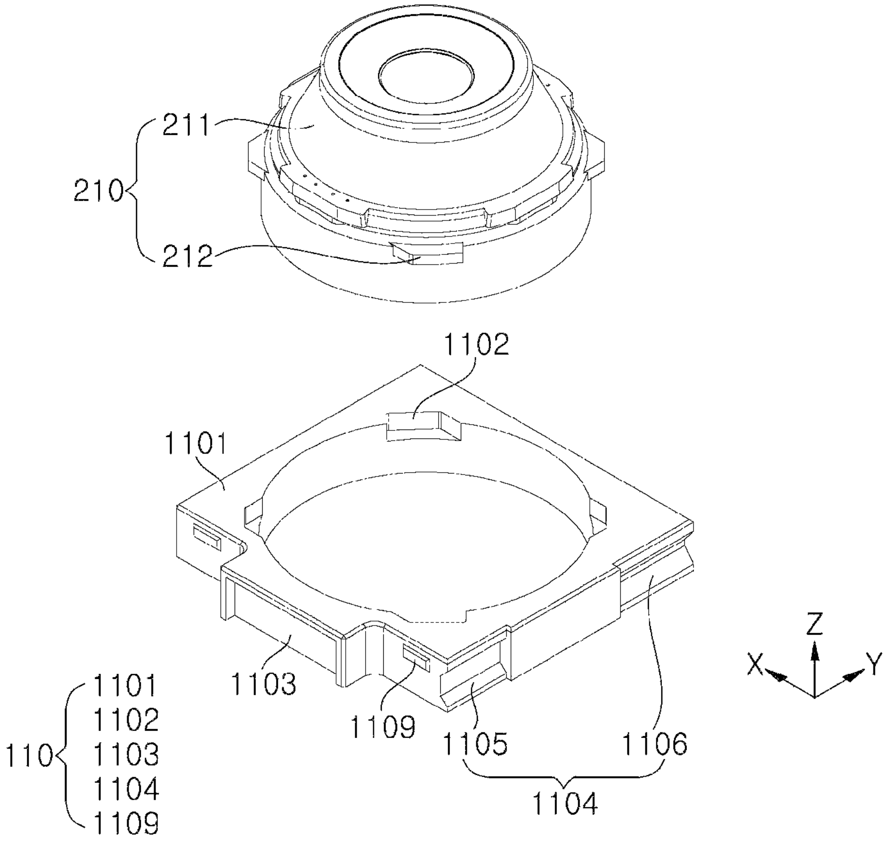
FIG. 4 is a view illustrating an optical module and a first holder of the image shake correcting module according to the first embodiment of the present invention.
Figure 5:
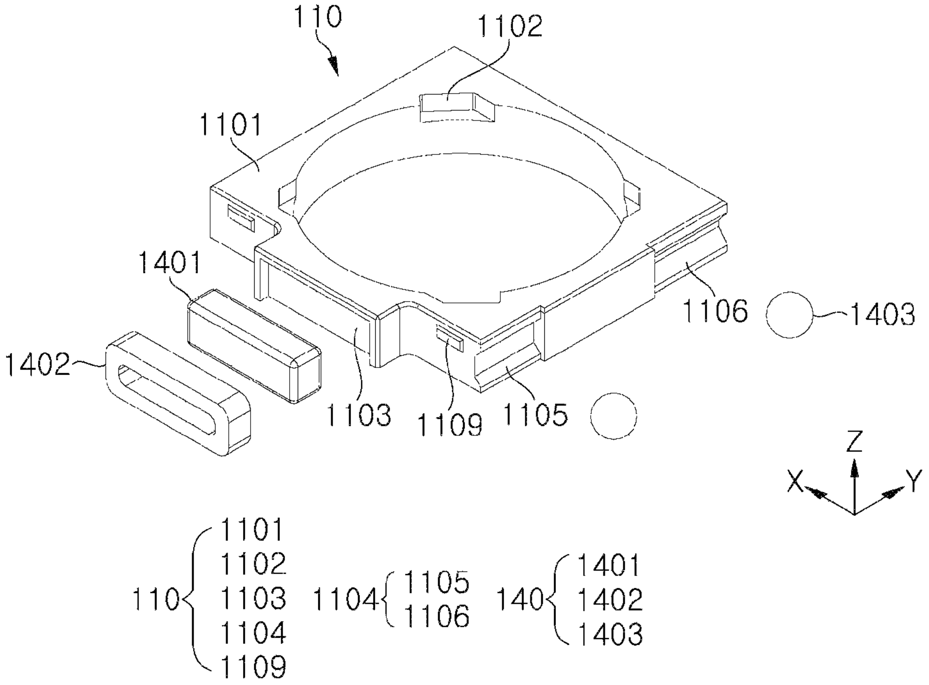
FIG. 5 is a view illustrating the first holder and a first drive unit of the image shake correcting module according to the first embodiment of the present invention.
Figure 6:
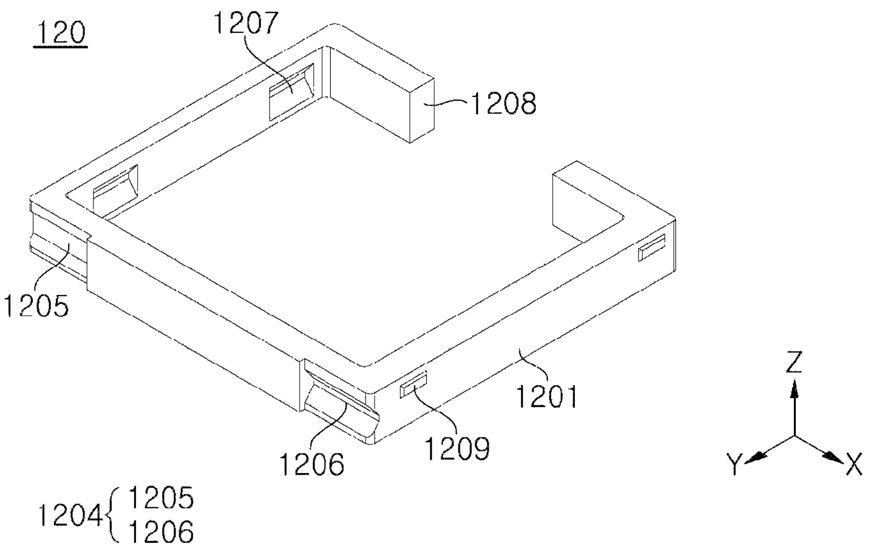
FIG. 6 is a view illustrating a second holder of the image shake correcting module according to the first embodiment of the present invention.
Figure 7:
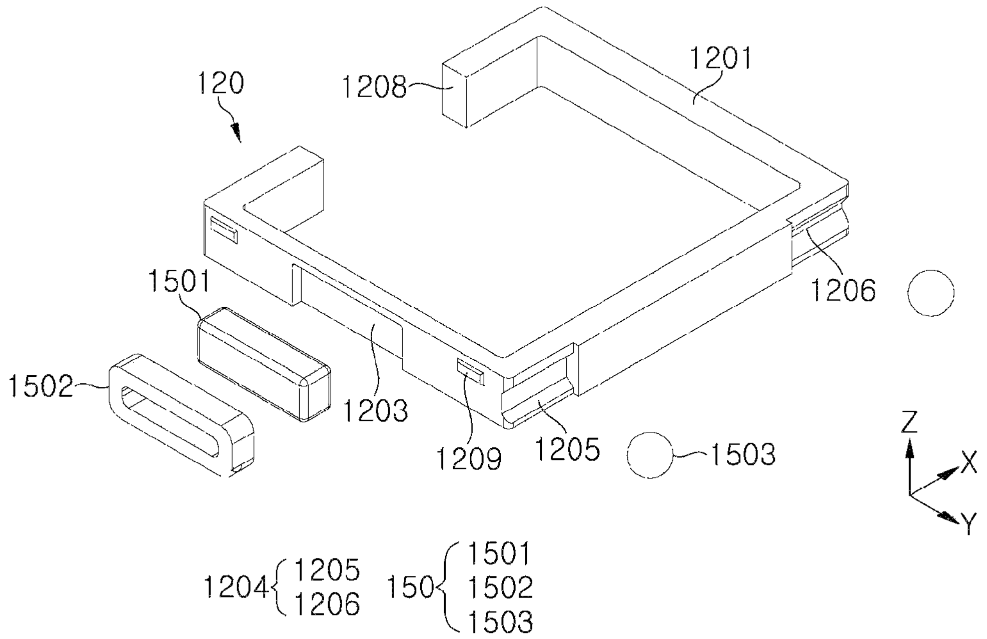
FIG. 7 is a view illustrating the second holder and a second drive unit of the image shake correcting module according to the first embodiment of the present invention.
Figure 8:
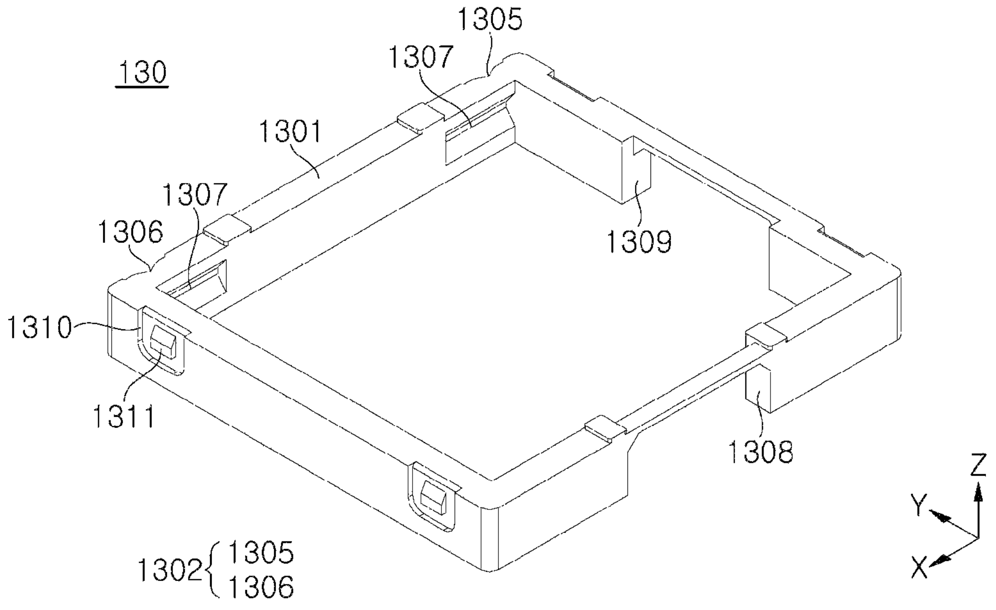
FIG. 8 is a view illustrating a third holder of the image shake correcting module according to the first embodiment of the present invention.
Figure 9:
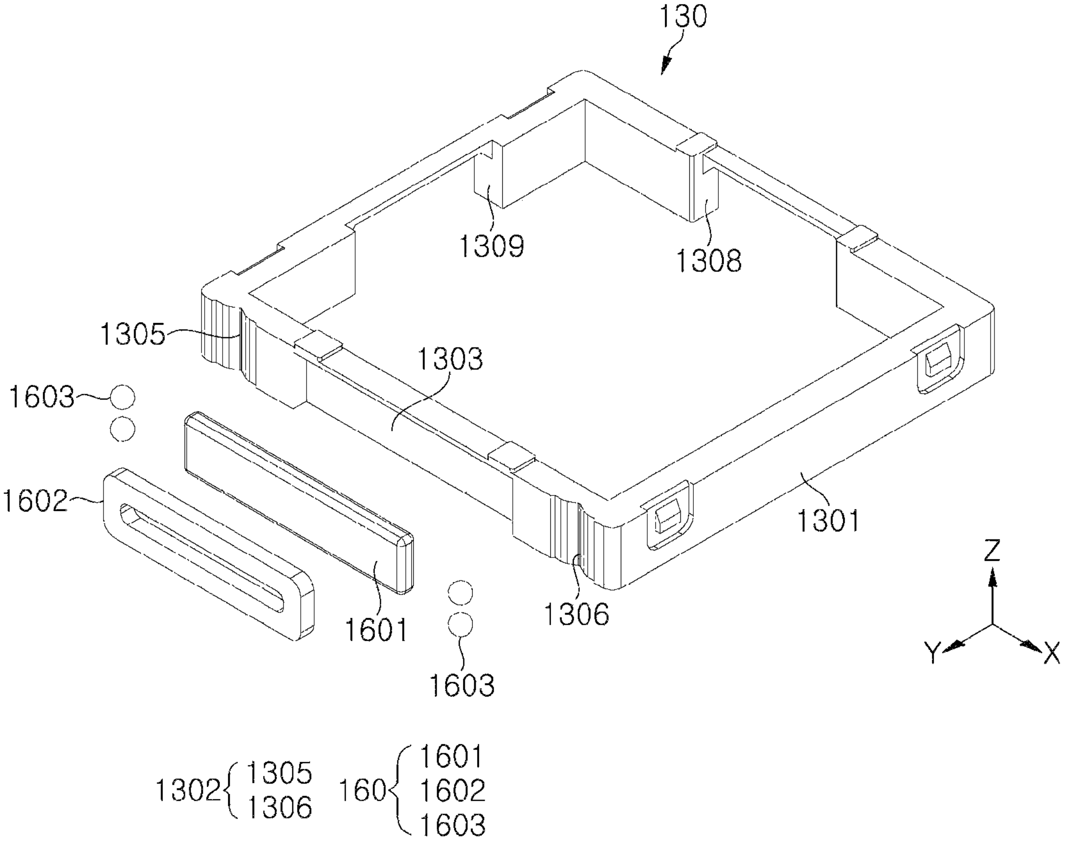
FIG. 9 is a view illustrating the third holder and a third drive unit of the image shake correcting module according to the first embodiment of the present invention.
Figure 10:
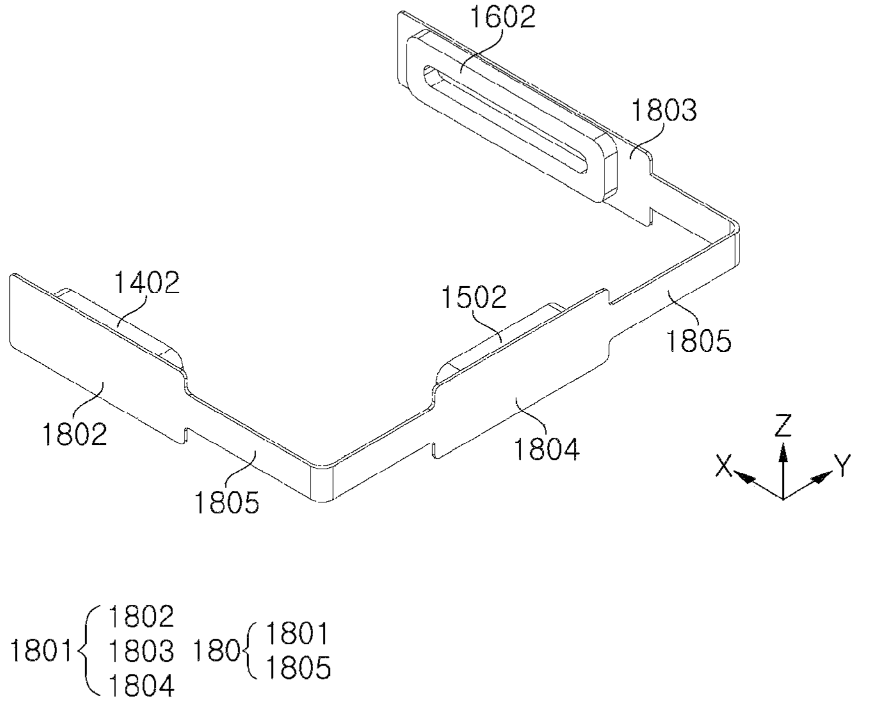
FIG. 10 is a view illustrating a substrate of the image shake correcting module according to the first embodiment of the present invention.
Figure 11:
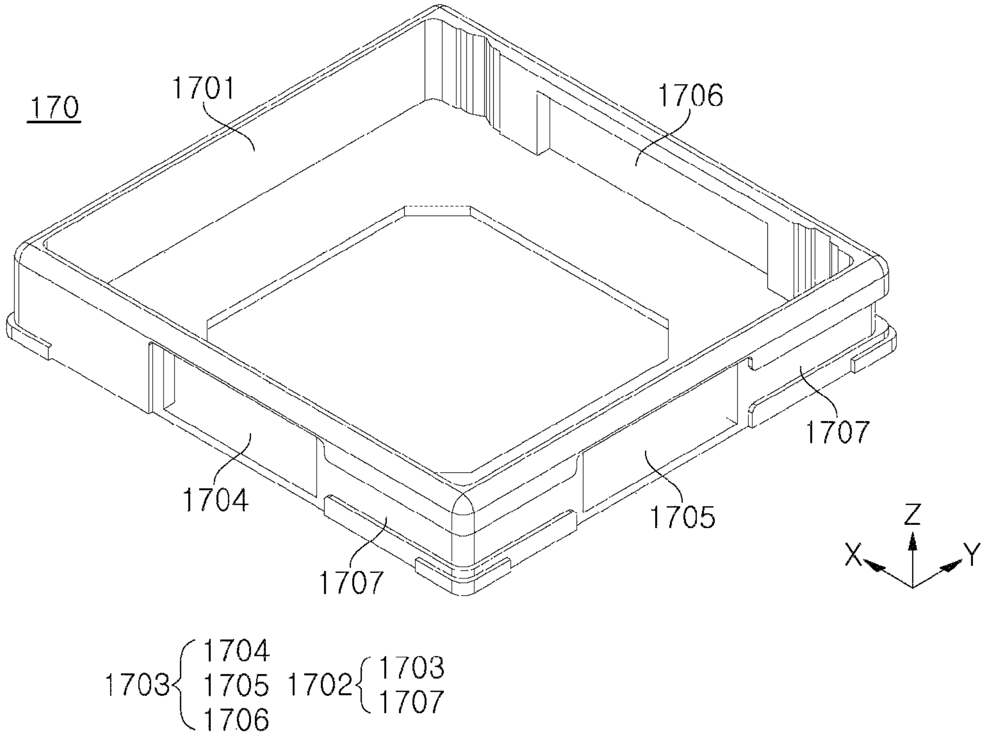
FIG. 11 is a view illustrating a housing of the image shake correcting module according to the first embodiment of the present invention.
Figure 12:
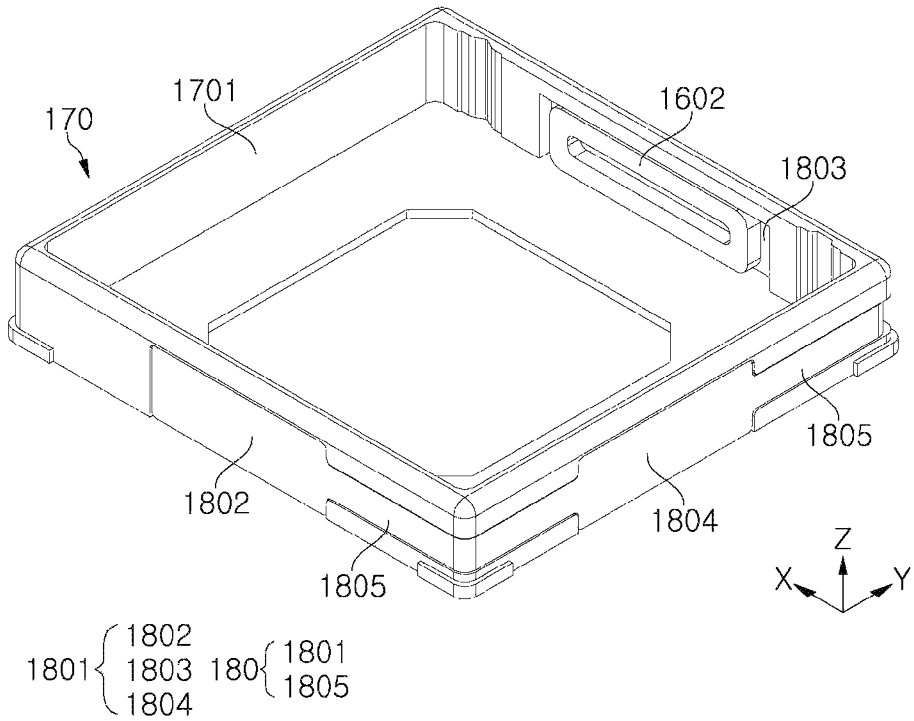
FIG. 12 is a view illustrating the housing of the image shake correcting module according to the first embodiment of the present invention on which a substrate and coils are mounted.
Figure 13:
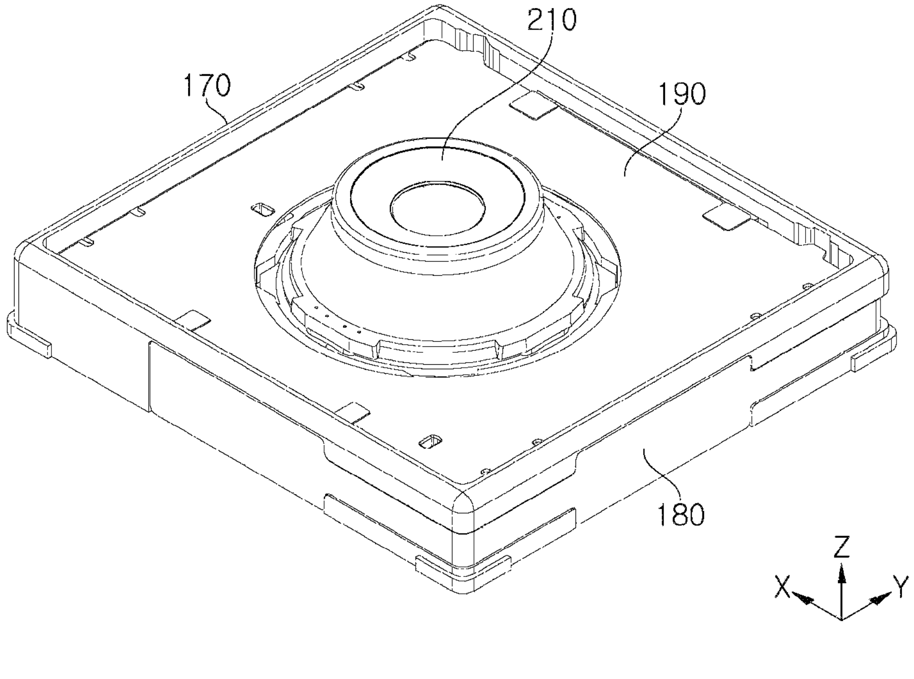
FIG. 13 is a view illustrating an inner cover of the image shake correcting module according to the present invention.

FIG. 1 is an assembly view of an image shake correcting module according to a first embodiment of the present invention. FIG. 2 is an exploded perspective view of the image shake correcting module according to the first embodiment of the present invention. FIG. 3 is a first cross-sectional view (A1-A2) of the image shake correcting module according to the first embodiment of the present invention. FIG. 4 is a view illustrating an optical module and a first holder of the image shake correcting module according to the first embodiment of the present invention. FIG. 5 is a view illustrating the first holder and a first drive unit of the image shake correcting module according to the first embodiment of the present invention. FIG. 6 is a view illustrating a second holder of the image shake correcting module according to the first embodiment of the present invention. FIG. 7 is a view illustrating the second holder and a second drive unit of the image shake correcting module according to the first embodiment of the present invention. FIG. 8 is a view illustrating a third holder of the image shake correcting module according to the first embodiment of the present invention. FIG. 9 is a view illustrating the third holder and a third drive unit of the image shake correcting module according to the first embodiment of the present invention. FIG. 10 is a view illustrating a substrate of the image shake correcting module according to the first embodiment of the present invention. FIG. 11 is a view illustrating a housing of the image shake correcting module according to the first embodiment of the present invention. FIG. 12 is a view illustrating the housing of the image shake correcting module according to the first embodiment of the present invention on which a substrate and coils are mounted. FIG. 13 is a view illustrating an inner cover of the image shake correcting module according to the present invention.

Referring to FIG. 1 to FIG. 3, the image shake correcting module 1 according to the first embodiment of the present invention may include an optical module 210, first to third holders 110, 120, 130, first to third drive units 140, 150, 160, a housing 170, a substrate 180, an inner cover 190, and an outer cover 200.

The optical module 210 may be provided with lenses that focus light representing an image of a subject onto an image capturing device (not shown).

In the image shake correcting module 1 according to this embodiment, the first drive unit 140 and the second drive unit 150 move the optical module 210 to correct image shake in a horizontal direction.

The optical module 210 may be mounted in an inner space of the first holder 110 and secured to the first holder 110.

Primary driving of the optical module 210 may be performed by the first drive unit 140 and the first holder 110. In this embodiment, primary driving refers to horizontal movement of the optical module 210 in the y-axis direction.

Referring to FIG. 4 and FIG. 5, the first holder 110 may include a first holder body 1101 having the optical module 210 mounted in the inner space thereof, optical module-securing grooves 1102 on which the optical module 210 is mounted, a first magnet mount 1103 on which a first magnet 1401 is mounted, and a first drive guide 1104 into which first drive balls 1403 are inserted.

The first holder body 1101 may include the inner space open at upper and lower surfaces thereof and the optical module 210 may be inserted into the inner space of the first holder body 1101.

The inner space of the first holder 110 may be formed with the optical module-securing grooves 1102. The optical module-securing grooves 1102 may be formed on an inner surface of the first holder 110 defining the inner space of the first holder body 1101. In addition, the optical module-securing grooves 1102 may have a groove structure, which is concavely indented from the inner surface of the first holder body 1101 towards an outer surface thereof and is open at an upper portion thereof, as shown in FIG. 4.

The optical module 210 may include a lens, an optical module body 211 surrounding the lens, and an optical module-securing portion 212 formed on an outer surface of the optical module body 211.

The optical module-securing portion 212 may protrude outwards from the outer surface of the optical module body 211. For example, the optical module-securing portion 212 may have a structure corresponding to the optical module-securing grooves 1102 of the first holder 110.

When the optical module 210 is disposed in the inner space of the first holder 110, the optical module-securing portion 212 of the optical module 210 may be mounted on the optical module-securing grooves 1102. The optical module-securing portion 212 of the optical module 210 may be mounted on the optical module-securing grooves 1102 of the first holder 110 such that the optical module 210 is kept inserted into the first holder 110. As a result, the optical module 210 may move in response to movement of the first holder 110. That is, when the first holder 110 moves in the x-axis direction, the optical module 210 may also move in the x-axis direction; when the first holder 110 moves in the y-axis direction, the optical module 210 may also move in the y-axis direction, and when the first holder 110 moves in the z-axis direction, the optical module 210 may also move in the z-axis direction.

Referring to FIG. 4 and FIG. 5, the first magnet mount 1103 and the first drive guide 1104 of the first holder 110 may be formed on side surfaces of the first holder body 1101. The side surfaces of the first holder body 1101 may include first to fourth side surfaces. In the first holder body 1101, the first side surface may face the third side surface on the y-axis and the second side surface may face the fourth side surface on the x-axis.

The first magnet mount 1103 may be formed on the first side surface of the first holder body 1101. In addition, the first magnet mount 1103 may protrude laterally from the first side surface of the first holder body 1101 and may include a groove formed in a protruding portion thereof.

The first drive guide 1104 is adapted to guide movement of the first holder 110 and the first drive balls 1403 and may be formed on the second side surface of the first holder body 1101.

The first drive guide 1104 has a groove structure and may be formed in an elongated shape on the second side surface of the first holder body 1101 along the y-axis. In addition, the first drive guide 1104 may be provided in plural. The number of first drive guides 1104 may be the same as the number of first drive balls 1403. For example, when the first drive unit 140 includes two first drive balls 1403, the first holder 110 may include two first drive guides 1104. That is, the first drive guides 1104 may include a first-1 drive guide 1105 and a first-2 drive guide 1106.

The first-1 drive guide 1105 and the first-2 drive guide 1106 may be formed in an elongated shape on the second side surface of the first holder body 1101 along the y-axis and may be arranged parallel to each other. In addition, the first-1 drive guide 1105 may be spaced apart from the first-2 drive guide 1106. That is, a portion of the second side surface not formed with a groove may be placed between the first-1 drive guide 1105 and the first-2 drive guide 1106.

Referring to FIG. 5, the first drive unit 140 may include the first magnet 1401, a first coil 1402, and the first drive balls 1403.

The first magnet 1401 of the first drive unit 140 may be mounted on the first magnet mount 1103 of the first holder 110. Here, a portion of the first magnet 1401 may be inserted into the first magnet mount 1103. More specifically, a portion of the first magnet 1401 may be inserted into the groove of the first magnet mount 1103. Accordingly, the first magnet mount 1103 can prevent the first magnet 1401 from deviating from a predetermined location.

The first coil 1402 may be disposed to face the first magnet 1401. Referring to FIG. 3, the first coil 1402 may be mounted on the substrate 180 secured to the housing 170 to face the first magnet 1401.

Referring to FIG. 3 and FIG. 5, the first drive balls 1403 are disposed between the first holder 110 and the second holder 120 placed outside the first holder 110. Here, the first drive balls 1403 may be partially inserted into the grooves of the first drive guides 1104. That is, with some portions of the first drive balls 1403 inserted into the first drive guides 1104, the first drive balls 1403 may be fitted into a space between the first holder 110 and the second holder 120. Further, the first drive balls 1403 may rotate in a state of being fitted into the first drive guides 1104 to allow easy movement of the first holder 110 in the y-axis direction.

When electric current flows to the first coil 1402 through the substrate 180, the first magnet 1401 may be moved along the y-axis by force generated from the first coil 1402 and the first magnet 1401. For example, the first magnet 1401 may move in a positive direction of the y-axis when electric current flows in the first coil 1402 in one direction. In addition, the first magnet 1401 may move in a negative direction of the y-axis when electric current flows in the first coil 1402 in an opposite direction to the one direction. Movement of the first coil 1402 on the y-axis may be adjusted depending on the flow direction of electric current in the first coil 1402 and the positions of N and S poles of the first magnet.

When the first magnet 1401 moves in the positive direction of the y-axis, the first holder 110 having the first magnet 1401 mounted thereon also moves in the positive direction of the y-axis. Here, the first drive balls 1403 are rotated by movement of the first holder 110. In addition, the first drive balls 1403 may be moved along the first drive guides 1104 by movement of the first holder 110 while rotating. In addition, the first holder 110 may be moved by the first drive guides 1104 and the first drive balls 1403 in the positive direction of the y-axis instead of moving in a different direction other than the y-axis direction.

Further, when the first magnet 1401 moves in the negative direction of the y-axis, the first holder 110 having the first magnet 1401 mounted thereon also moves in the negative direction of the y-axis. Here, the first drive balls 1403 are rotated by movement of the first holder 110. In addition, the first drive balls 1403 may be moved along the first drive guides 1104 by movement of the first holder 110 while rotating. Further, the first holder 110 may be moved by the first drive guides 1104 and the first drive balls 1403 in the negative direction of the y-axis instead of moving in a different direction other than the y-axis direction.

As such, the first holder 110 may be moved along the y-axis by force generated from the first magnet 1401 and the first coil 1402, rotation of the first drive balls 1403 and the structure of the first drive guides 1104. In addition, the optical module 210 received in the first holder 110 may also be moved together with the first holder 110.

Referring to FIG. 4 and FIG. 5, the first holder 110 may further include a plurality of first stoppers 1109. The first stoppers 1109 may protrude outwards from the side surfaces of the first holder 110. More specifically, the first stoppers 1109 may be formed on opposite side surfaces of the first holder 110 placed on the y-axis on which primary driving of the first holder 110 occurs. Upon primary driving of the first holder 110, the first stoppers 1109 may contact an inner surface of the second holder 120. That is, the first stoppers 1109 may serve to restrict a movement range of the first holder 110.

The first holder 110 having the optical module 210 mounted therein may be mounted inside the second holder 120. Here, with the first holder 110 secured inside the second holder 120, the first holder 110 may be moved along the y-axis by the first drive balls 1403 and the first drive guides 1104.

Referring to FIG. 6, the second holder 120 may include first drive ball mounts 1207 formed on an inner surface of a second holder body 1201 and having a groove structure. Some portions of the first drive balls 1403 are inserted into the first drive ball mounts 1207. Accordingly, the first drive ball mounts 1207 may be formed on an inner surface of the second side surface of the second holder 120. Accordingly, with some portions of the first drive balls 1403 inserted into the first drive guides 1104 of the first holder 110 and the other portions thereof inserted into the first drive ball mounts 1207 of the second holder 120, the first drive balls 1403 may rotate thereon. Since both the first drive guides 1104 and first drive ball mounts 1207 have a groove structure, the first drive balls 1403 can be prevented from deviating above or below the first holder 110 and the second holder 120.

When the first holder 110 is mounted in the inner space of the second holder 120, the outer surface of the first holder 110 may be spaced apart from the inner surface of the second holder 120. Since the first holder 110 is spaced apart from the second holder 120, the first holder 110 may move in the inner space of the second holder 120 upon movement of the first magnet 1401.

In addition, the first drive balls 1403 fitted into the first drive guides 1104 and the first drive ball mounts 1207 may prevent the first holder 110 from moving out of the inner space of the second holder 120.

Referring to FIG. 7, the second holder 120 may include the second holder body 1201, a second magnet mount 1203, and second drive guides 1204.

The second holder body 1201 has an inner space of a through-hole structure open from an upper surface thereof to a lower surface thereof. The first holder 110 having the optical module 210 mounted therein and the first drive unit 140 may be partially disposed in the inner space of the second holder body 1201. Here, the portion of the first drive unit 140 disposed in the inner space of the second holder body 1201 is the first drive balls 1403.

The second magnet mount 1203 and the second drive guides 1204 of the second holder 120 may be formed on side surfaces of the second holder body 1201. The side surfaces of the second holder body 1201 may include first to fourth side surfaces. In the second holder body 1201, the first side surface may face the third side surface on the y-axis and the second side surface may face the fourth side surface on the x-axis.

The second magnet mount 1203 may be formed on the second side surface of the second holder body 1201. In addition, the second magnet mount 1203 has a groove structure concavely indented from the second side surface.

The second drive guide 1204 is adapted to guide movement of the second holder 120 and the second drive balls 1503 and may be formed on the third side surface of the second holder body 1201.

The second drive guide 1204 has a groove structure and may be formed in an elongated shape on the second side surface of the second holder body 1201 along the x-axis. In addition, the second drive guide 1204 may be provided in plural. The number of second drive guides 1204 may correspond to the number of second drive balls 1503. For example, when the second drive unit 150 includes two second drive balls 1503, the second holder 120 may include two second drive guides 1204. That is, the second drive guides 1204 may include a second-1 drive guide 1205 and a second-2 drive guide 1206.

The second-1 drive guide 1205 and the second-2 drive guide 1206 may be formed in an elongated shape on the third side surface of the second holder body 1201 along the x-axis and may be arranged parallel to each other. In addition, the second-1 drive guide 1205 may be spaced apart from the second-2 drive guide 1206 and a portion of the third side surface protruding beyond the second drive guide 1204 may be placed therebetween.

The first side surface of the second holder 120 facing the third side surface thereof may be formed with a first opening 1208. The first opening 1208 has a through-hole structure formed through a portion of the third side surface from an upper side thereof to a lower side thereof. When the first holder 110 is received in the inner space of the second holder 120, the first magnet mount 1103 of the first holder 110 may be placed in the first opening 1208, as shown in FIG. 3.

Referring to FIG. 7, the second drive unit 150 may include a second magnet 1501, a second coil 1502, and the second drive balls 1503.

The second magnet 1501 of the second drive unit 150 may be mounted on the second magnet mount 1203 of the second holder 120 such that the second magnet 1501 is partially inserted into the second magnet mount.

The second coil 1502 may be disposed to face the second magnet 1501. Referring to FIG. 3, the second coil 1502 may be mounted on the substrate 180 secured to the housing 170 to face the second magnet 1501.

Referring to FIG. 3 and FIG. 7, the second drive balls 1503 are disposed between the second holder 120 and the third holder 130 placed outside the second holder 120. Here, with some portions of the second drive balls 1503 inserted into the second drive guides 1204, the second drive balls 1503 may be fitted into a space between the second holder 120 and the third holder 130. Further, the second drive balls 1503 rotate in a state of being fitted into the second drive guides 1204 to allow easy movement of the second holder 120 in the x-axis direction.

When electric current flows to the second coil 1502 through the substrate 180, the second magnet 1501 may be moved along the x-axis by force generated from the second coil 1502 and the second magnet 1501. More specifically, the second magnet 1501 may move in a negative or positive direction of the x-axis depending on a flow direction of electric current in the second coil 1502 and the positions of N and S poles of the second magnet 1501.

The second holder 120 having the second magnet 1501 mounted thereon may also move along the x-axis in response to movement of the second magnet 1501. Here, the second drive balls 1503 rotate in the second drive guides 1204 to assist in movement of the second holder 120 along the x-axis by the second drive guides 1204. As such, the second holder 120 may be moved along the x-axis by force generated from the second magnet 1501 and the second coil 1502, rotation of the second drive balls 1503 and the structure of the second drive guides 1204. In addition, the first holder 110 received in the second holder 120 may also be moved together with the second holder 120. Accordingly, the optical module 210 received in the first holder 110 may also be moved together with the second holder 120.

As such, the image shake correcting module 1 according to this embodiment may correct image shake in the y-axis direction by moving the optical module 210 in the y-axis direction through the first drive unit 140 and the first holder 110. In addition, the image shake correcting module 1 according to this embodiment may correct image shake in the x-axis direction by moving the optical module 210 in the x-axis direction through the second drive unit 150 and the second holder 120.

In addition, referring to FIG. 6 and FIG. 7, the second holder 120 may further include a plurality of second stoppers 1209 that serve to restrict a movement range of the second holder 120 in the x-axis direction. The second stoppers 1209 may protrude outwards from opposite side surfaces of the second holder 120 on the x-axis. Upon secondary driving of the second holder 120, the second stoppers 1209 may contact the inner surface of the second holder 120 to restrict movement of the second holder 120.

Referring to FIG. 8 and FIG. 9, the third holder 130 may include a third holder body 1301, a third magnet mount 1303, third drive guides 1304, second drive ball mounts 1307, a second opening 1308, and a third opening 1309.

The third holder body 1301 may have an inner space open from an upper surface thereof to a lower surface thereof. The second holder 120 having the optical module 210 and the first holder 110 received therein may be disposed inside the inner space of the third holder body 1301. Here, an inner surface of the third holder 130 may be spaced apart from an outer surface of the second holder 120.

In addition, the inner surface of the third holder body 1301 may be formed with the second drive ball mounts 1307. Some portions of the second drive balls 1503 may be inserted into the second drive ball mounts 1307. Accordingly, some portions of the second drive balls 1503 may be inserted into the second drive guides 1204 of the second holder 120 and the other portions of the second drive balls 1503 may be inserted into the second drive ball mounts 1307 of the third holder 130. Accordingly, instead of deviating from the third holder 130, the second holder 120 may be placed in the inner space of the third holder 130 by the second drive balls 1503.

The third magnet mount 1303, the third drive guides 1304, the second opening 1308, and the third opening 1309 of the third holder 130 may be formed on side surfaces of the third holder body 1301. The side surfaces of the third holder body 1301 may include first to fourth side surfaces. In the third holder body 1301, the first side surface may face the third side surface on the y-axis and the third side surface may face the fourth side surface on the x-axis.

The third magnet mount 1303 may be formed on the third side surface of the third holder body 1301. The third magnet mount 1303 has a groove structure concavely indented from the third side surface.

The third drive guides 1304 are adapted to guide movement of the third holder 130 and third drive balls 1603. In this embodiment, the third drive guide 1304 may be formed on the third side surface of the third holder body 1301. In addition, the third drive guides 1304 may extend from an upper side of the third side surface of the third holder body 1301 to a lower side thereof. That is, the third drive guides 1304 may be formed in an elongated shape on the third side surface of the third holder body 1301 in the z-axis direction. The third drive guides 1304 may include a third-1 drive guide 1305 and a third-2 drive guide 1306. The third-1 drive guide 1305 and the third-2 drive guide 1306 may be spaced apart from each other and the third magnet mount 1303 may be placed therebetween.

The second opening 1308 may be formed on the first side surface of the third holder body 1301. The second opening 1308 may have a structure in which an upper portion of the first side surface is closed and a lower portion thereof is open. In addition, the second opening 1308 may have a through-hole structure formed from an inner surface of the first side surface to an outer surface thereof.

The third opening 1309 may be formed on the second side surface of the third holder body 1301. The third opening 1309 may have a structure in which an upper portion of the second side surface is closed and a lower portion thereof is open. In addition, the second opening 1308 may have a through-hole structure formed from an inner surface of the second side surface to an outer surface thereof.

At least part of the first drive unit 140 may be disposed in the second opening 1308 of the third holder 130.

The first magnet 1401 mounted on the first holder 110 may be placed inside the third holder 130 and at least part of the first coil 1402 facing the first magnet 1401 may be placed outside the third holder 130. Here, the second opening 1308 is placed between the first magnet 1401 and the first coil 1402. The second opening 1308 of the third holder 130 may define a space in which interaction between the first magnet 1401 and the first coil 1402 occurs. In addition, the first magnet 1401 may be partially placed in the second opening 1308 according to movement of the first holder 110.

At least part of the second drive unit 150 may be disposed in the third opening 1309 of the third holder 130.

The second magnet 1501 mounted on the second holder 120 may be placed inside the third holder 130 and at least part of the second coil 1502 facing the second magnet 1501 may be placed outside the third holder 130. Here, the third opening 1309 is placed between the second magnet 1501 and the second coil 1502. The third opening 1309 of the third holder 130 may define a space in which interaction between the second magnet 1501 and the second coil 1502 occurs. In addition, the second magnet 1501 may be partially placed in the third opening 1309 according to movement of the second holder 120.

Referring to FIG. 9, the third drive unit 160 may include a third magnet 1601, a third coil 1602, and third drive balls 1603.

The third magnet 1601 may be mounted on the third magnet mount 1303 of the third holder 130 such that the third magnet 1601 is partially inserted into the third magnet mount 1303.

The third coil 1602 may be disposed to face the third magnet 1601. Referring to FIG. 3, the third coil 1602 may be mounted on the substrate 180 secured to the housing 170 to face the third magnet 1601.

Referring to FIG. 3 and FIG. 9, the third drive balls 1603 are disposed between the third holder 130 and the housing 170 placed outside the third holder 130. Here, some portions of the third drive balls 1603 may be inserted into the third drive guides 1304. Further, the third drive balls 1603 rotate in a state of being fitted into the third drive guides 1304 to allow easy movement of the third holder 130 in the z-axis direction.

When electric current flows to the third coil 1602 through the substrate 180, the third magnet 1601 may be moved along the z-axis by force generated from the third coil 1602 and the third magnet 1601. The third holder 130 may move on the z-axis in response to movement of the third magnet 1601. Here, the third drive balls 1603 may assist in movement of the third holder 130 by moving corresponding to movement of the third holder 130 while rotating in the third drive guides 1304. Here, since the third drive balls 1603 move along the third drive guides 1304, movement of the third holder 130 does not deviate from the z-axis. That is, the third holder 130 may be moved along the z-axis by force generated from the third magnet 1601 and the third coil 1602, rotation of the third drive balls 1603 and the structure of the third drive guides 1304. Accordingly, the second holder 120, the first holder 110 and the optical module 210 received in the third holder 130 may also be moved together with the third holder 130.

Referring to FIG. 10, the substrate 180 may include coil seats 1801. In addition, the coil seats 1801 may include first to third coil seats 1802, 1803, 1804. The first coil 1402 of the first drive unit 140 may be mounted on the first coil seat 1802. The second coil 1502 of the second drive unit 150 may be mounted on the second coil seat 1803. In addition, the third coil 1602 of the third drive unit 160 may be mounted on the third coil seat 1804.

Further, the substrate 180 may include a connecting portion 1805, which connects the first coil seat 1802 to the second coil seat 1803 and connects the second coil seat 1803 to the third coil seat 1804.

The substrate 180 may include wires for application of electric current to the first to third coils 1402, 1502, 1602. That is, the substrate 180 may be electrically connected to the first to third coils 1402, 1502, 1602. When electric current flows in the first to third coils 1402, 1502, 1602 through the substrate 180, the first to third holders 110, 120, 130 move in the flow direction of electric current. For example, the substrate 180 may be a printed circuit board 180 in which at least the connecting portion 1805 is formed of a soft material. Since at least the connecting portion of the substrate 180 is formed of the soft material, the connecting portion can be bent, as shown in FIG. 10.

Although the first to third coils 1402, 1502, 1602 are mounted on the same substrate 180, the first to third coils 1402, 1502, 1602 may be electrically insulated from one another. That is, the substrate 180 may allow individual operation of the first to third coils 1402, 1502, 1602.

Referring to FIG. 11, the housing 170 may include a housing body 1701 and a substrate mount 1702 formed on the housing body 1701. In addition, the body of the housing 170 may have an inner space in which the optical module 210, the first holder 110, the first drive unit 140, the second holder 120, the second drive unit 150, the third holder 130, and the third drive unit 160 are disposed.

The substrate mount 1702 may be formed on side surfaces of the housing body 1701 and may be composed of holes 1703 and grooves 1707 corresponding to the structure of the substrate 180. The holes 1703 of the substrate mount 1702 may have a through-hole structure formed from an inner surface of the housing 170 to an outer surface thereof through the housing 170 through the housing 170. The holes 1703 of the substrate mount 1702 may be formed on the first side surface, the second side surface, and the third side surface of the housing 170, respectively. A first hole 1704 may be formed on the first side surface of the housing 170, a second hole 1705 may be formed on the second side surface thereof, and a third hole 1706 may be formed on the third side surface thereof. The grooves 1707 of the substrate mount 1702 may be formed on the first to third side surfaces of the housing 170 to connect the first hole 1704 to the second hole 1705 and to connect the second hole 1705 to the third hole 1706.

Referring to FIG. 12, the connecting portion 1805 of the substrate 180 may be connected to the grooves 1707 of the substrate mount 1702 and the coil seats 1801 of the substrate 180 having the coils seated thereon may be inserted into the hole 1703 of the substrate mount 1702. The first hole 1704 of the substrate mount 1702 may be provided with the first coil 1402 and the first coil seat 1802 on which the first coil 1402 is mounted. The second hole 1705 of the substrate mount 1702 may be provided with the second coil 1502 and the second coil seat 1803 on which the second coil 1402 is mounted. In addition, the third hole 1706 of the substrate mount 1702 may be provided with the third coil 1602 and the third coil seat 1804 on which the third coil 1602 is mounted.

When the substrate 180 is mounted on the housing 170, the first coil 1402 on the substrate 180 faces the first magnet 1401 on the first holder 110, the second coil 1502 faces the second magnet 1501 on the second holder 120, and the third coil 1602 faces the third magnet 1601 on the third holder 130, as shown in FIG. 3.

Referring to FIG. 2, the inner cover 190 may include an inner cover portion 1901 having a plate structure, an opening 1902 formed in the inner cover portion 1901, and a securing portion 1903 protruding downwards from the inner cover portion 1901.

Referring to FIG. 13, when the inner cover 190 is mounted on the housing 170, the inner cover portion 1901 excluding the opening 1902 may cover an upper portion of the inner space of the housing 170. Here, the optical module 210 passes through the opening 1902 formed in the inner cover portion 1901.

In addition, the securing portion 1903 of the inner cover 190 may be inserted into a space between the third holder 130 and the housing 170. Furthermore, referring to FIG. 2, the securing portion 1903 of the inner cover 190 may be formed with fastening holes 1904. In addition, referring to FIG. 8, the third holder 130 may be formed on the side surfaces thereof with fastening grooves 1310, into which the securing portion 1903 of the inner cover 190 is inserted, and first protrusions 1311 inserted into the fastening holes 1904 of the securing portion 1903. Thus, the inner cover 190 may be fastened to the third holder 130 to be secured to the housing 170 while covering the upper portion of the inner space of the housing 170.

Referring to FIG. 3, the outer cover 200 may be formed to cover an upper surface and a side surface of the housing 170. Here, the outer cover 200 is formed on an upper surface thereof with an opening 201 through which the optical module 210 passes. The outer cover 200 may cover the upper surface of the housing 170 to prevent components inside the housing 170 from moving out of the housing 170. In addition, the outer cover 200 may cover the side surface of the housing 170 to prevent the substrate 180 mounted on the side surface of the housing 170 from moving out of the housing 170.

A typical image shake correcting module has a structure in which components for correction of image shake in the x-axis direction and components for correction of image shake in the y-axis direction are stacked. More specifically, in the typical image shake correcting module, balls for correction of image shake in the x-axis direction and balls for correction of image shake in the y-axis direction are stacked in the vertical direction. However, such a stacked structure of the image shake correcting module has a limit in reduction in thickness thereof. Here, the thickness refers to the length in the z-axis direction.

In the image shake correcting module 1 according to this embodiment, the first drive unit 140 and the second drive unit 150 for correction of image shake in the horizontal direction are disposed on the same horizontal line. Accordingly, the first drive balls 1403 for correction of image shake in the y-axis direction and the second drive balls 1503 for correction of image shake in the x-axis direction are disposed on the same horizontal line instead of being stacked in the vertical direction.

As such, the image shake correcting module 1 according to the present invention can achieve further reduction in thickness than the typical image shake correcting module in which the balls are stacked in the vertical direction. Furthermore, a device adopting the image shake correcting module 1 according to this embodiment can have a reduced thickness.

Next, various embodiments of the image shake correcting module will be described. Here, in description of various embodiments of the image shake correcting module, the following description will focus on different features than the image shake correcting module 1 according to the first embodiment of the invention. Thus, for omitted description of various embodiments of the image shake correcting module, refer to the description of the image shake correcting module 1 according to the first embodiment of the invention.

FIG. 14 to FIG. 17 are views of an image shake correcting module according to a second embodiment of the present invention.

Figure 14:
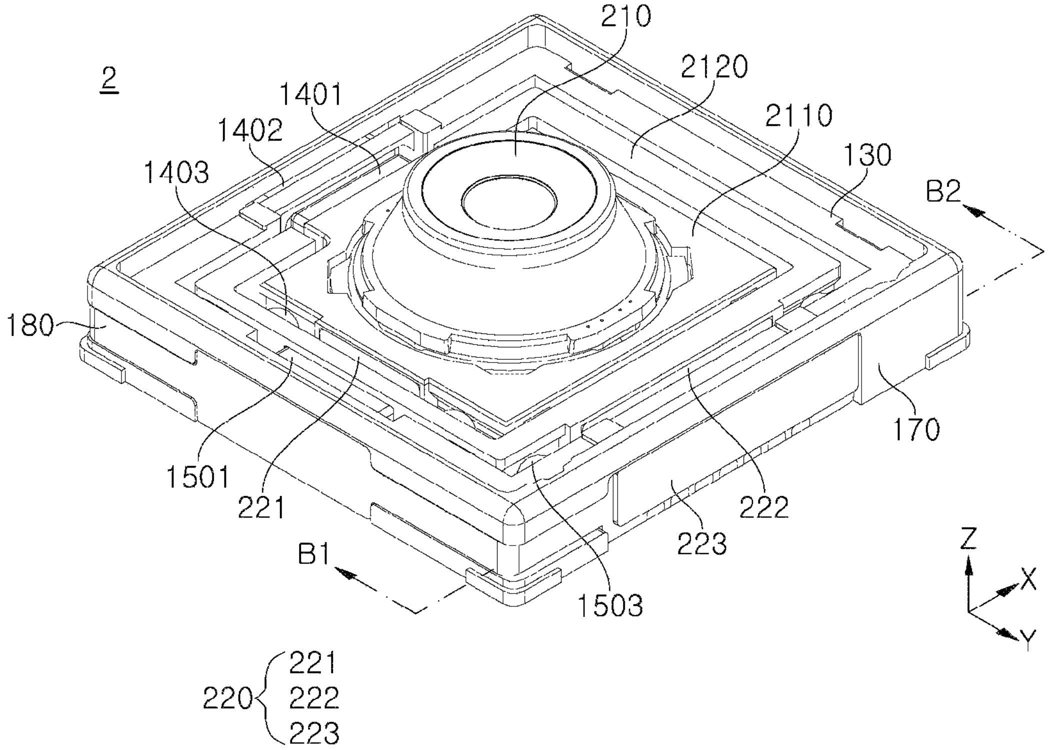
FIG. 14 is a perspective view of an image shake correcting module according to a second embodiment of the present invention, from which an outer cover and an inner cover are omitted.
Figure 15:
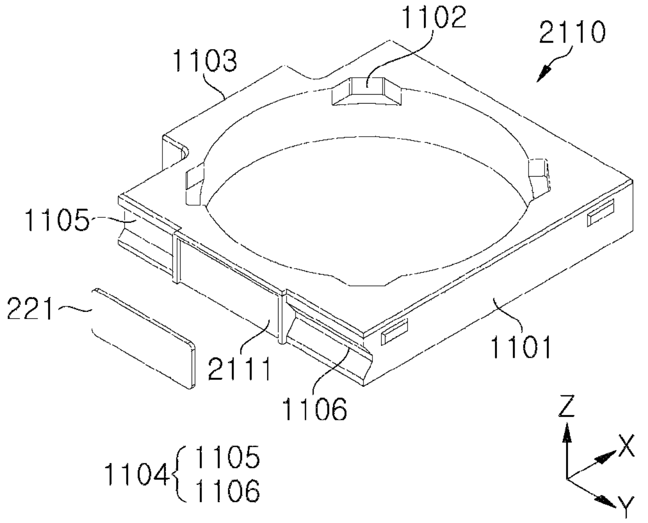
FIG. 15 is a view illustrating a first holder and a first securing plate of the image shake correcting module according to the second embodiment of the present invention.
Figure 16:
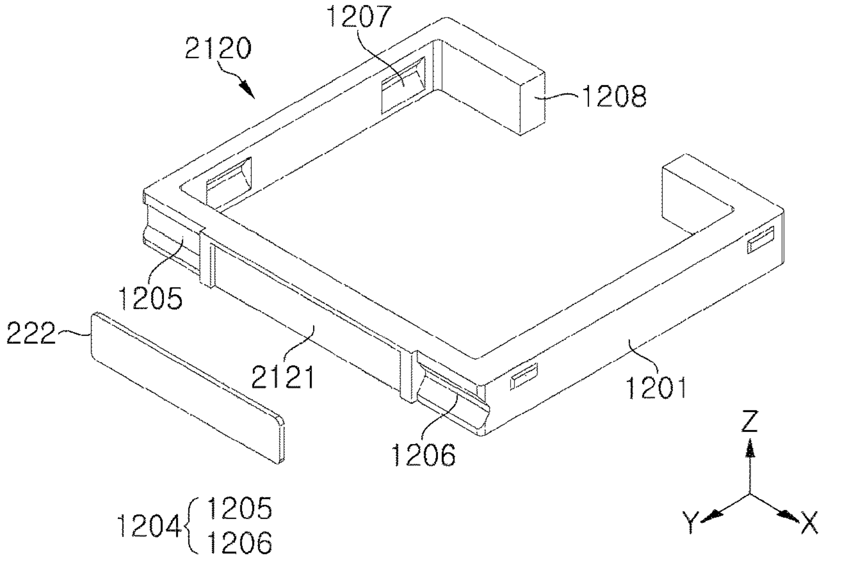
FIG. 16 is a view illustrating a second holder and a second securing plate of the image shake correcting module according to the second embodiment of the present invention.
Figure 17:
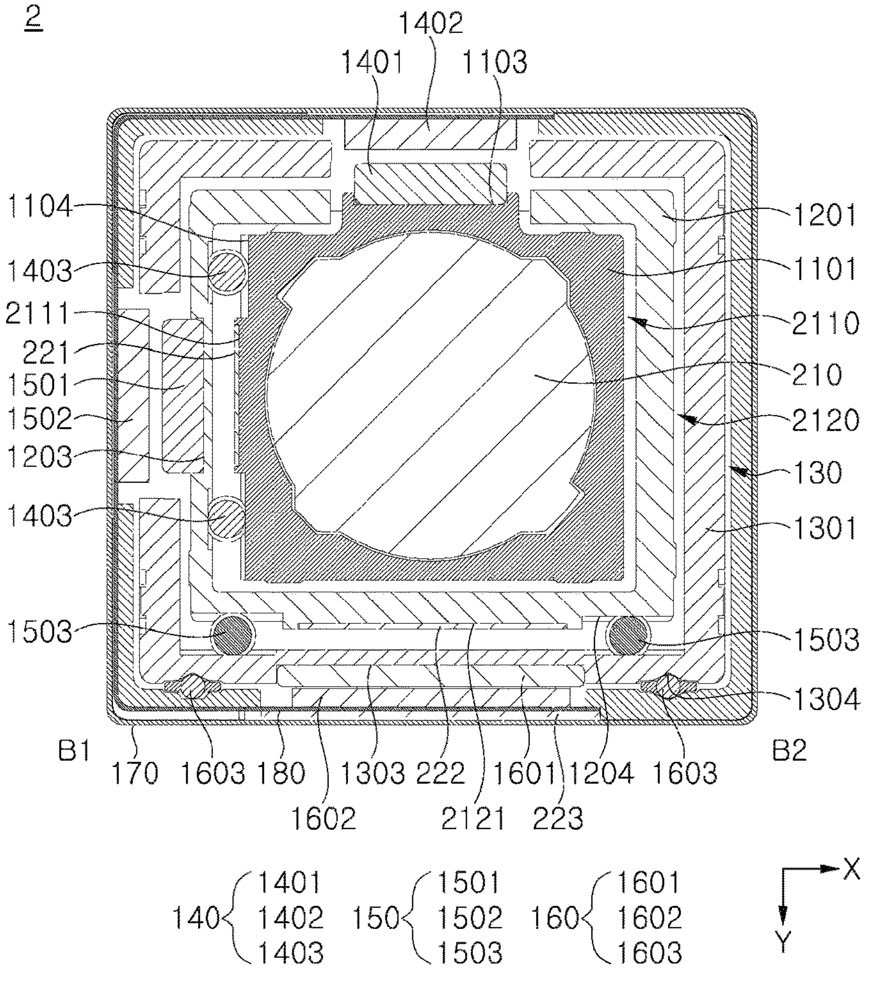
FIG. 17 is a cross-sectional view (B1-B2) of the image shake correcting module according to the second embodiment of the present invention.

FIG. 14 is a perspective view of the image shake correcting module according to the second embodiment of the present invention. More specifically, FIG. 14 is a perspective view of the image shake correcting module according to the second embodiment of the present invention, from which an outer cover and an inner cover are omitted. FIG. 15 is a view illustrating a first holder and a first securing plate of the image shake correcting module according to the second embodiment of the present invention. FIG. 16 is a view illustrating a second holder and a second securing plate of the image shake correcting module according to the second embodiment of the present invention. FIG. 17 is a cross-sectional view (B1-B2) of the image shake correcting module according to the second embodiment of the present invention.

The image shake correcting module 2 according to the second embodiment further includes a securing plate 220 in addition to the component of the image shake correcting module 1 according to the first embodiment (see FIG. 1 to FIG. 13). For description of other components excluding the securing plate 220, refer to the description of the image shake correcting module 1 according to the first embodiment (see FIG. 1 to FIG. 13).

According to this embodiment, the securing plate 220 may include a first securing plate 221, a second securing plate 222, and a third securing plate 223.

Referring to FIG. 15, a first holder 2110 may include a first securing plate-mounting groove 2111 on which the first securing plate 221 is mounted. The first securing plate-mounting groove 2111 may be formed on the second side surface of the first holder body 1101. More specifically, the first securing plate-mounting groove 2111 may be formed in a groove shape between the first-1 drive guide 1105 and the first-2 drive guide 1106. Here, the first securing plate-mounting groove 2111 may be formed to protrude outwards beyond the first-1 drive guide 1105 and the first-2 drive guide 1106.

The first securing plate 221 may be inserted into the first securing plate-mounting groove 2111 to be mounted on the first holder 2110.

Referring to FIG. 16, a second holder 2120 may include a second securing plate-mounting groove 2121 on which the second securing plate 222 is mounted. The second securing plate-mounting groove 2121 may be formed on the third side surface of the second holder body 1201. More specifically, the second securing plate-mounting groove 2121 may be formed in a groove shape between the second-1 drive guide 1205 and the second-2 drive guide 1206. Here, the second securing plate-mounting groove 2121 may be formed to protrude outwards beyond the second-1 drive guide 1205 and the second-2 drive guide 1206.

The second securing plate 222 may be inserted into the second securing plate-mounting groove 2121 to be mounted on a second holder 2120.

Referring to FIG. 14, the third securing plate 223 may be disposed outside the substrate 180. In addition, referring to FIG. 14 and FIG. 17, the third securing plate 223 may be disposed to face the second securing plate 222, with the third magnet 1601 disposed therebetween. That is, both the first securing plate 222 and the third securing plate 223 are affected by the third magnet 1601.

Referring to FIG. 17, the first securing plate 221 mounted on the first holder 2110 may be disposed to face the first magnet 1401. That is, the first securing plate 221 and the first magnet 1401 may be disposed to face each other, with the second side surface of the second holder 2120 disposed therebetween. In addition, the second securing plate 222 mounted on the second holder 2120 may be disposed to face the second magnet 1501. That is, the second securing plate 222 and the second magnet 1501 may be disposed to face each other, with the third side surface of the third holder 130 disposed therebetween. Further, the first securing plate 221 and the second securing plate 222 may be formed of a metallic material to allow generation of attractive force from a magnet.

When the first securing plate 221 is formed of a metal, attractive force is generated between the first securing plate 221 and the first magnet 1401, whereby the second side surface of the first holder 2110 can be pulled toward the second side surface of the second holder 2120 by the attractive force. Accordingly, the second side surface of the first holder 2110 may press the first drive balls 1403 disposed between the second side surface of the first holder 2110 and the second side surface of the second holder 2120 towards the second side surface of the first holder 2110. As a result, the first holder 2110 can be more reliably prevented from moving out of the inner space of the second holder 2120 by the first drive balls 1403, the first securing plate 221 and the first magnet 1401.

Further, when the second securing plate 222 is formed of a metal, attractive force generated between the second securing plate 222 and the third magnet 1601 forces the third side surface of the second holder 2110 to be brought into close contact with the third side surface of the third holder 130. Accordingly, the third side surface of the second holder 2110 may press the second drive balls 1503 towards the third side surface of the third holder 130. As a result, the second holder 2120 can be more reliably prevented from moving out of the inner space of the third holder 130 by the second drive balls 1503, the second securing plate 222 and the third magnet 1601.

When the third securing plate 223 is formed of a metal, attractive force may be generated between the third securing plate 223 and the third magnet 1601. Here, the third securing plate 223 may press the substrate 180 disposed between the third securing plate 223 and the third magnet 1601 towards the third side surface of the third holder 130. In addition, the housing 170 is placed between the third holder 130 and the substrate 180. As a result, the third holder 130 can be prevented from moving out of the inner space of the housing 170 by the third securing plate 223 and the third magnet 1601.

FIG. 18 to FIG. 21 are views of an image shake correcting module according to a third embodiment of the present invention.

Figure 18:
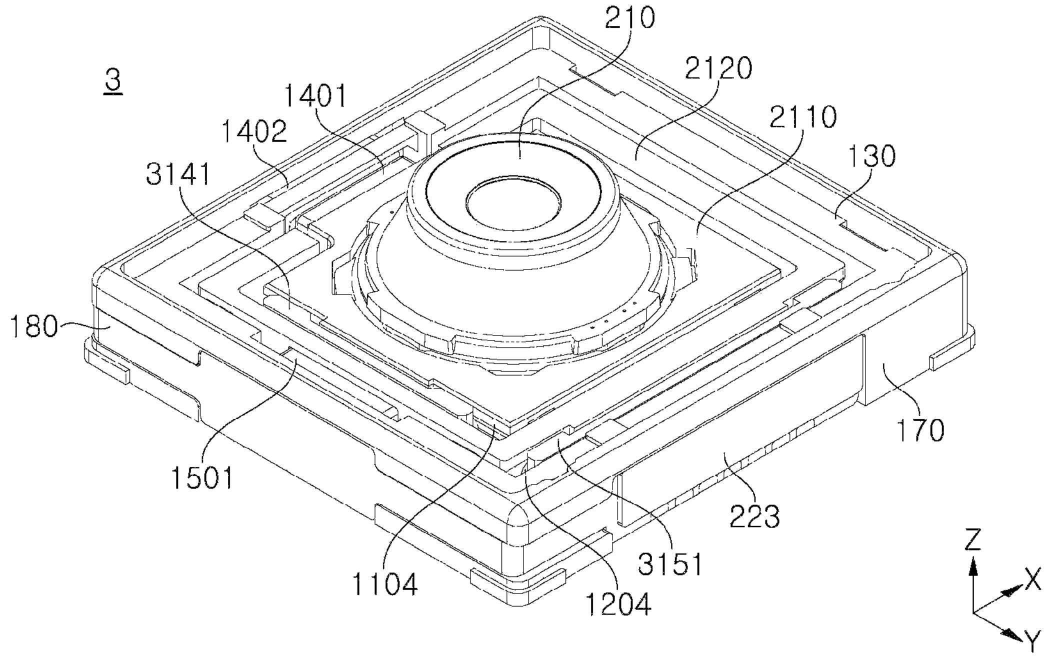
FIG. 18 is a perspective view of an image shake correcting module according to a third embodiment of the present invention, from which an outer cover and an inner cover are omitted.
Figure 19:
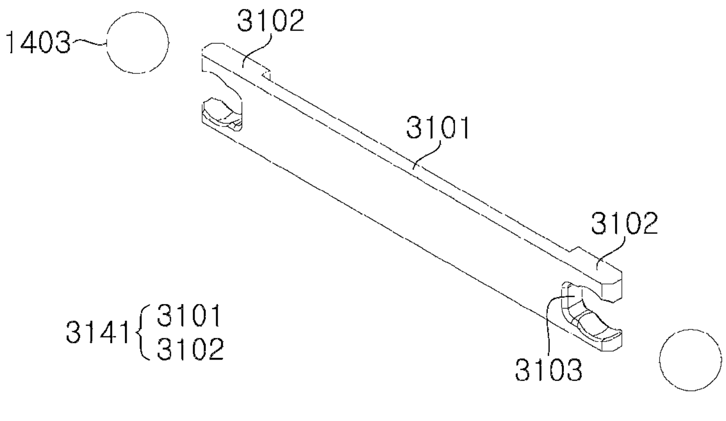
FIG. 19 is a view illustrating a drive ball cage of the image shake correcting module according to the third embodiment of the present invention.
Figure 20:
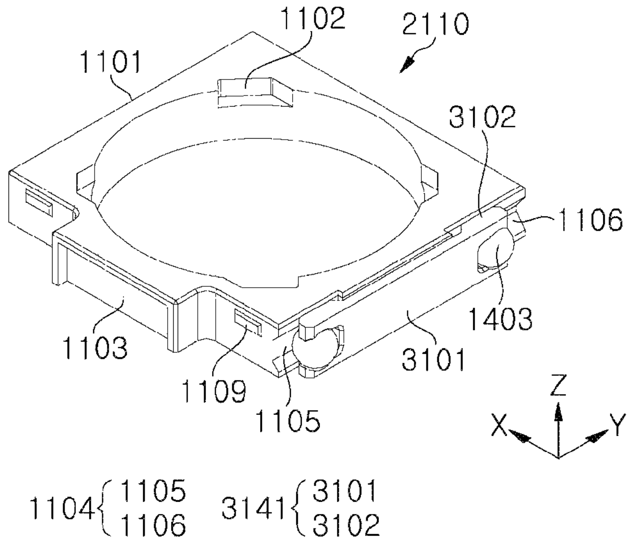
FIG. 20 is a view illustrating first drive balls and a first drive ball cage mounted on a first holder of the image shake correcting module according to the third embodiment of the present invention.
Figure 21:
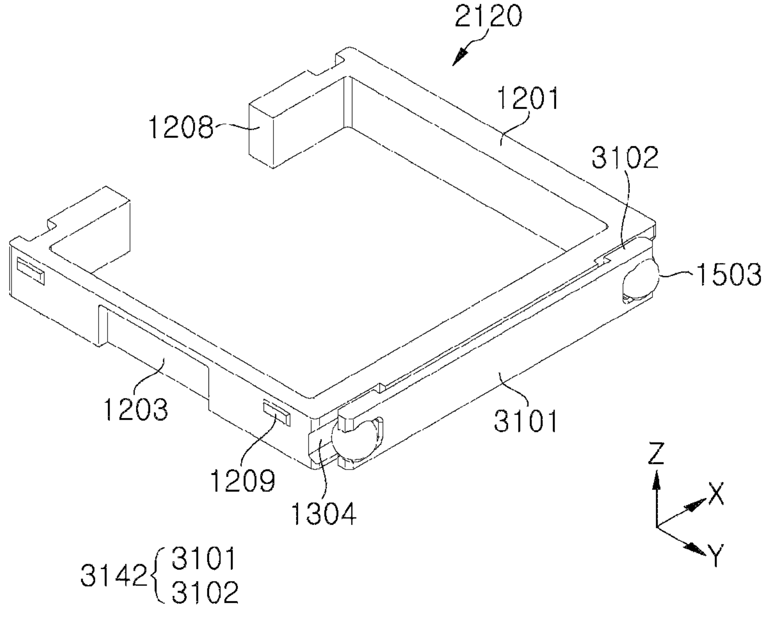
FIG. 21 is a view illustrating second drive balls and a second drive ball cage mounted on a second holder of the image shake correcting module according to the third embodiment of the present invention.

FIG. 18 is a perspective view of the image shake correcting module according to the third embodiment of the present invention. More specifically, FIG. 18 is a perspective view of the image shake correcting module according to the third embodiment of the present invention, from which an outer cover and an inner cover are omitted. FIG. 19 is a view illustrating a drive ball cage of the image shake correcting module according to the third embodiment of the present invention FIG. 20 is a view illustrating first drive balls and a first drive ball cage mounted on a first holder of the image shake correcting module according to the third embodiment of the present invention. FIG. 21 is a view illustrating second drive balls and a second drive ball cage mounted on a second holder of the image shake correcting module according to the third embodiment of the present invention.

The image shake correcting module 2 according to the third embodiment further includes a first drive ball cage 3141 and a second drive ball cage 3151 in addition to the components of the image shake correcting module 2 according to the second embodiment (see FIG. 14 to FIG. 17).

In the image shake correcting module 3 according to the third embodiment, a first drive unit 3140 may include the first drive ball cage 3141 having first drive balls 1403 mounted thereon and a second drive unit 3150 may include the second drive ball cage 3151 having second drive balls 1503 mounted thereon.

Referring to FIG. 19, the first drive ball cage 3141 may include a cage body 3101 and a drive ball-securing portion 3102. The cage body 3101 is formed in an elongated shape extending in one direction. Here, the drive ball-securing portion 3102 may be formed at each of opposite ends of the cage body 3101. According to this embodiment, the drive ball-securing portion 3102 may include a groove 3103 into which each of the first drive balls 1403 is inserted.

When the first drive balls 1403 are inserted into the grooves 3103 of the drive ball-securing portion 3102, the first drive balls 1403 may be mounted on the first drive ball cage 3141. Here, the first drive balls 1403 may rotate in a state of being mounted on the first drive ball cage 3141. Although the drive ball-securing portion 3102 has a structure including the grooves 3103 in this embodiment, it should be understood that the structure of the drive ball-securing portion 3102 is not limited thereto. The drive ball-securing portion 3102 may have any structure that allows the first drive balls 1403 to rotate in a state of being mounted on the first drive ball cage 3141.

In addition, the drive ball-securing portion 3102 may be formed to protrude inwards from the cage body 3101. Here, "inward" refers to a direction towards the first holder 2110.

Although FIG. 19 shows the first drive ball cage 3141, the second drive ball cage 3151 having the second drive balls 1503 mounted thereon also has the same structure as the first drive ball cage 3141.

Referring to FIG. 20, the first drive ball cage 3141 having the first drive balls 1403 mounted thereon may be mounted on the first holder 2110. Here, the cage body 3101 may face the protruding second side surface of the first holder 2110. In addition, the drive ball-securing portion 3102 protruding beyond the cage body 3101 may face the first drive guide 1104 of the first holder 2110.

In addition, referring to FIG. 21, the second drive ball cage 3151 having the second drive balls 1503 mounted thereon may be mounted on the second holder 2120. Here, the cage body 3101 may face the protruding third side surface of the second holder 2110. In addition, the drive ball-securing portion 3102 protruding beyond the cage body 3101 may face the second drive guide 1204 of the second holder 2120.

Referring to FIG. 18, the first drive ball cage 3141 having the first drive balls 1403 mounted thereon is disposed between the first holder 2110 and the second holder 2120, and the second drive ball cage 3151 having the second drive balls 1503 mounted thereon is disposed between the second holder 2120 and the third holder 130.

When the first holder 2110 moves, the first drive ball cage 3141 may move corresponding to movement of the first holder 2110 and the first drive balls 1403 may rotate in a state of being mounted on the first drive ball cage 3141. In addition, when the second holder 2120 moves, the second drive ball cage 3151 may move corresponding to movement of the second holder 2120 and the second drive balls 1503 may rotate in a state of being mounted on the second drive ball cage 3151.

According to this embodiment, the first drive ball cage 3141 may prevent the first drive balls 1403 from moving inside the first drive guide 1104 instead of rotating. In addition, the second drive ball cage 3151 may prevent the second drive balls 1503 from moving inside the second drive guide 1204 instead of rotating. That is, the first drive ball cage 3141 and the second drive ball cage 3151 allow efficient movement of the first holder 2110 and the second holder 2120 without obstruction by preventing movement of the first drive balls 1403 and the second drive balls 1503 without rotation.

Although the image shake correcting module 3 according to the third embodiment of the present invention further includes the drive ball cages 3141, 3151 in addition to the components of the image shake correcting module 2 according to the second embodiment of the present invention including the securing plate 220 (see FIG. 14 to FIG. 17), the image shake correcting module 3 according to the third embodiment may omit the securing plate 220.

FIG. 22 to FIG. 30 are views of an image shake correcting module according to a fourth embodiment of the present invention.

Figure 22:
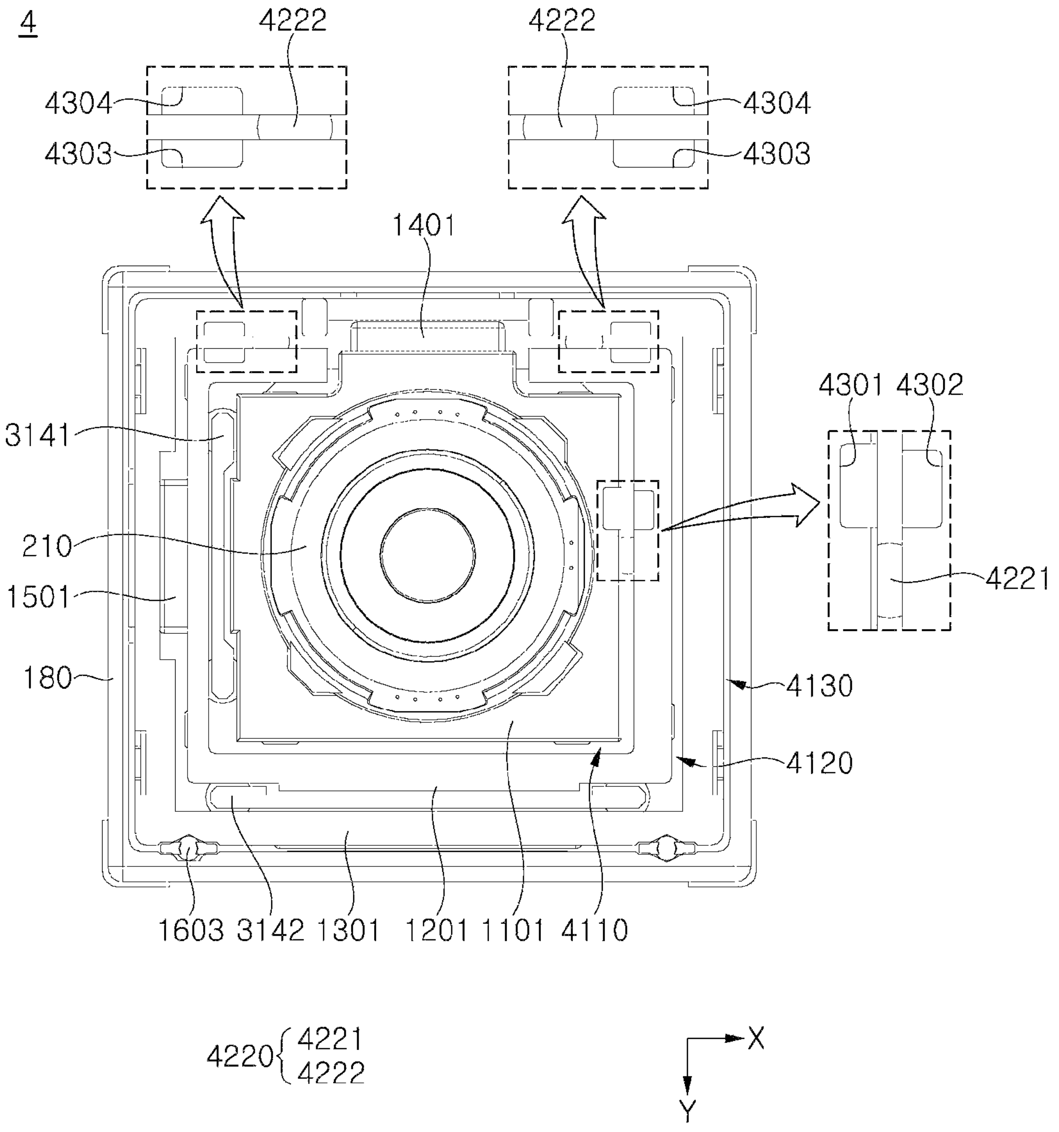
FIG. 22 is a front view of an image shake correcting module according to a fourth embodiment of the present invention, from which an outer cover and an inner cover are omitted.
Figure 23:
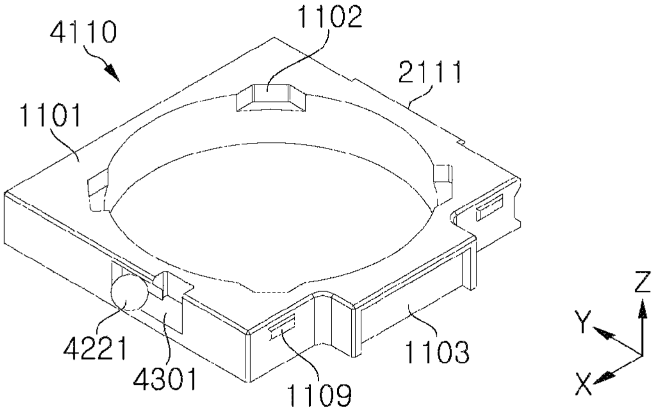
FIG. 23 is a view illustrating a first holder of the image shake correcting module according to the fourth embodiment of the present invention, on which a first assistant ball is mounted.
Figure 24:
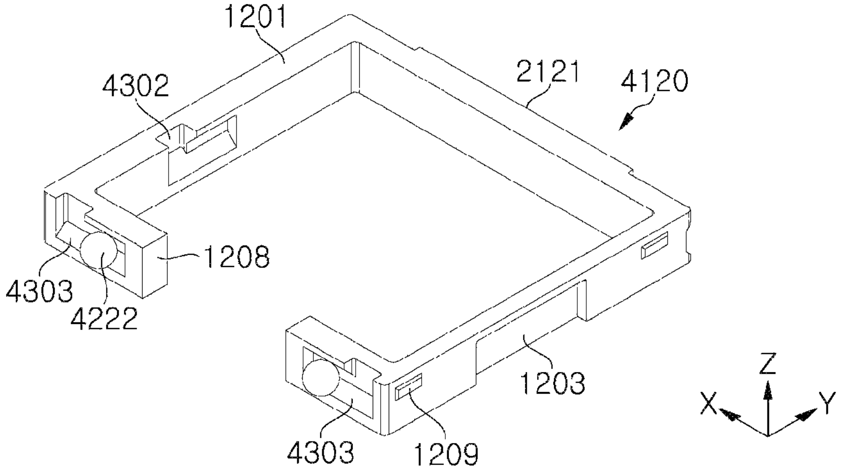
FIG. 24 is a view illustrating a second holder of the image shake correcting module according to the fourth embodiment of the present invention.
Figure 25:
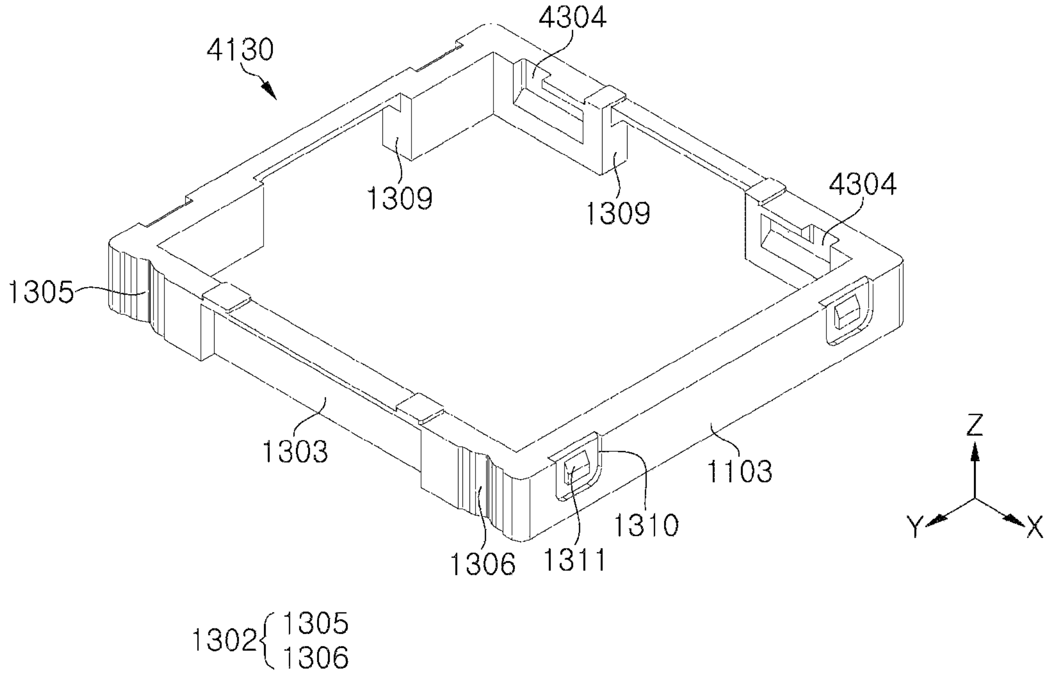
FIG. 25 is a view illustrating a third holder of the image shake correcting module according to the fourth embodiment of the present invention, on which a second assistant ball is mounted.
Figure 26:
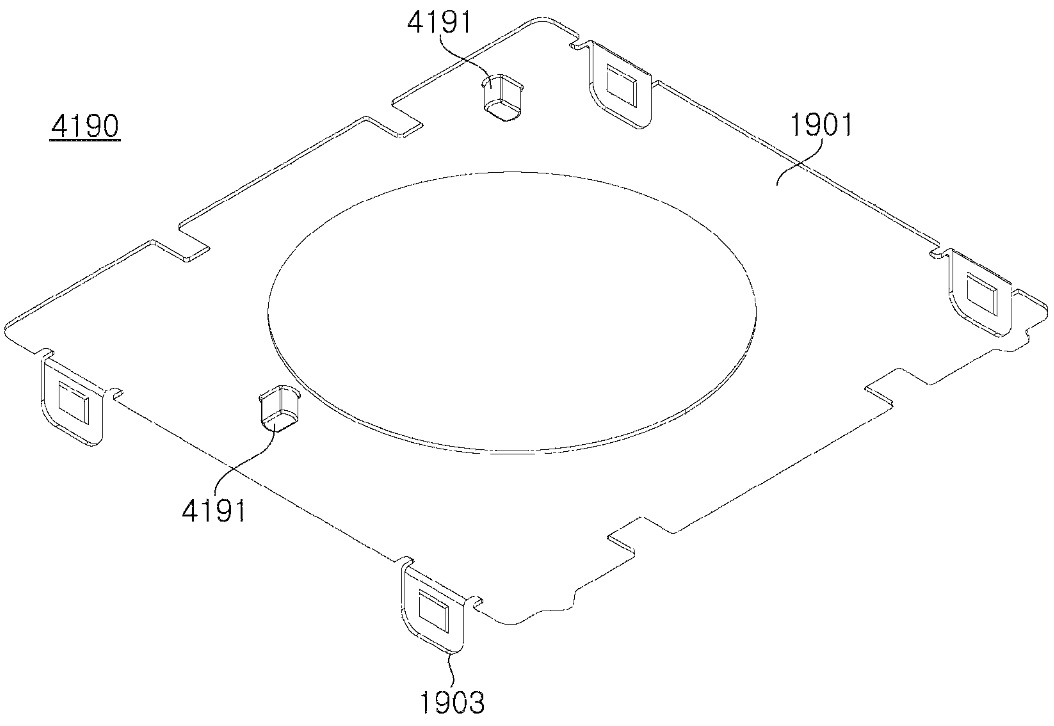
FIG. 26 is a view illustrating an inner cover of the image shake correcting module according to the fourth embodiment of the present invention.
Figure 27:
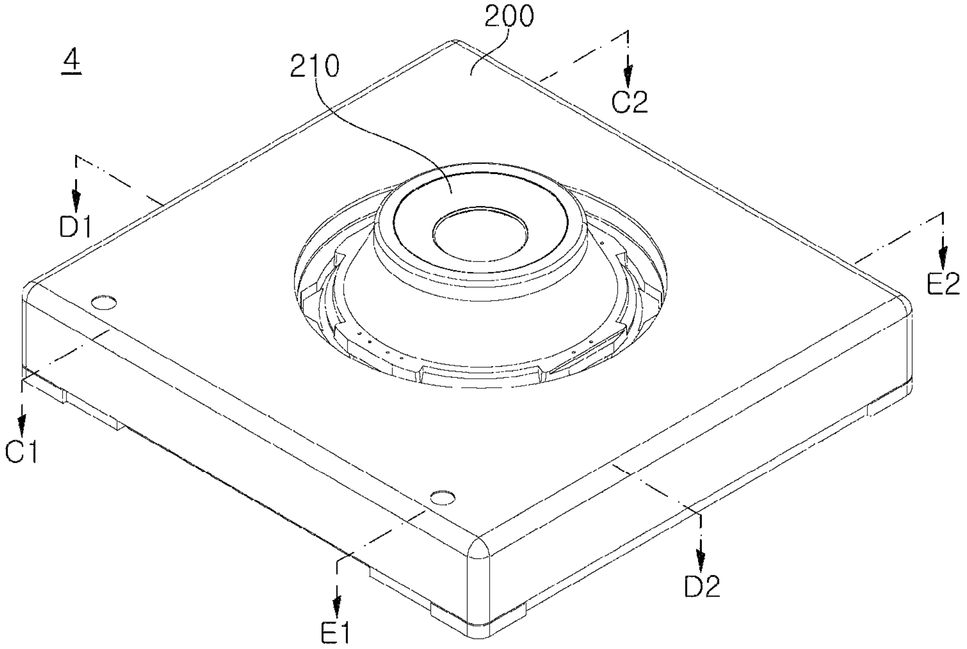
FIG. 27 is a perspective view of the image shake correcting module according to the fourth embodiment of the present invention.
Figure 28:
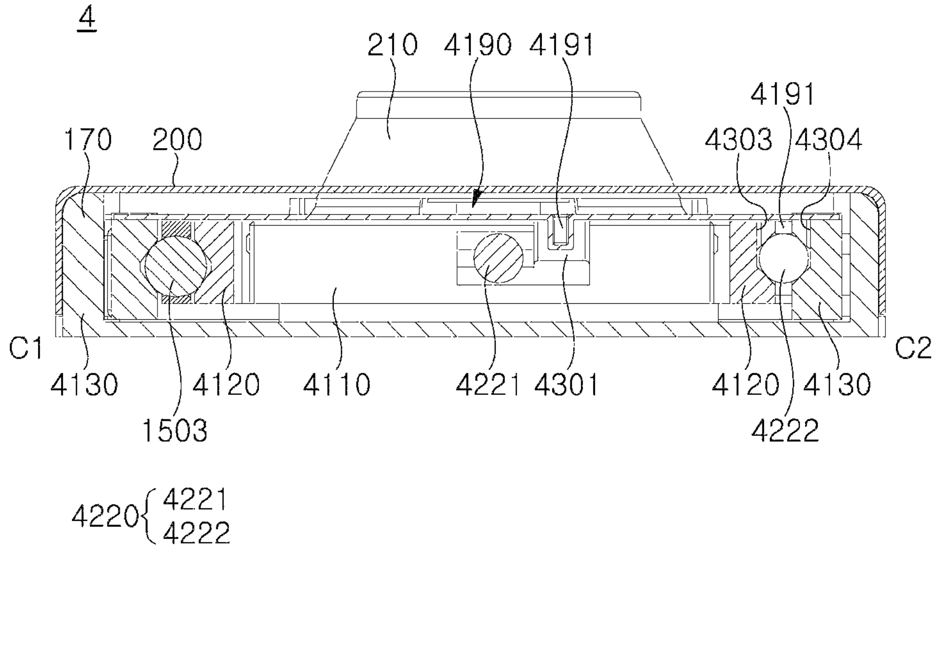
FIG. 28 is a first cross-sectional view (C1-C2) of the image shake correcting module according to the fourth embodiment of the present invention.
Figure 29:
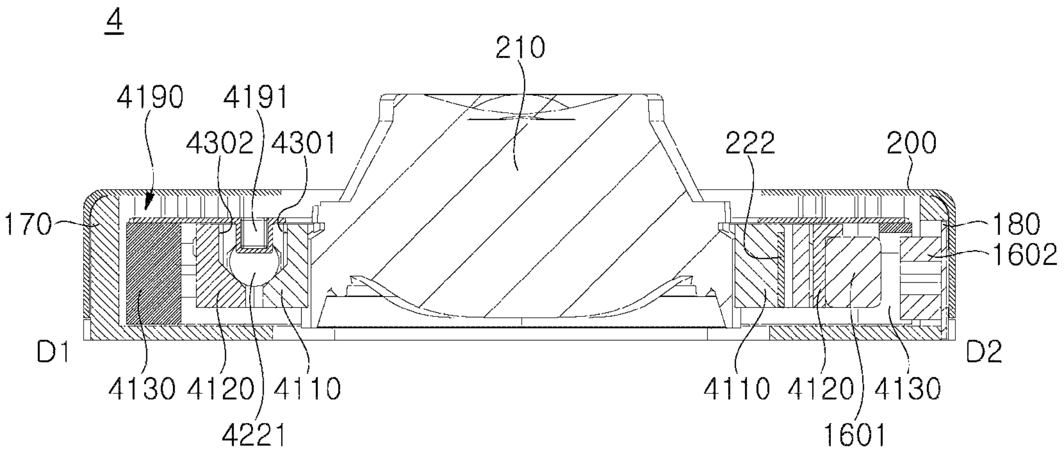
FIG. 29 is a second cross-sectional view (D1-D2) of the image shake correcting module according to the fourth embodiment of the present invention.
Figure 30:
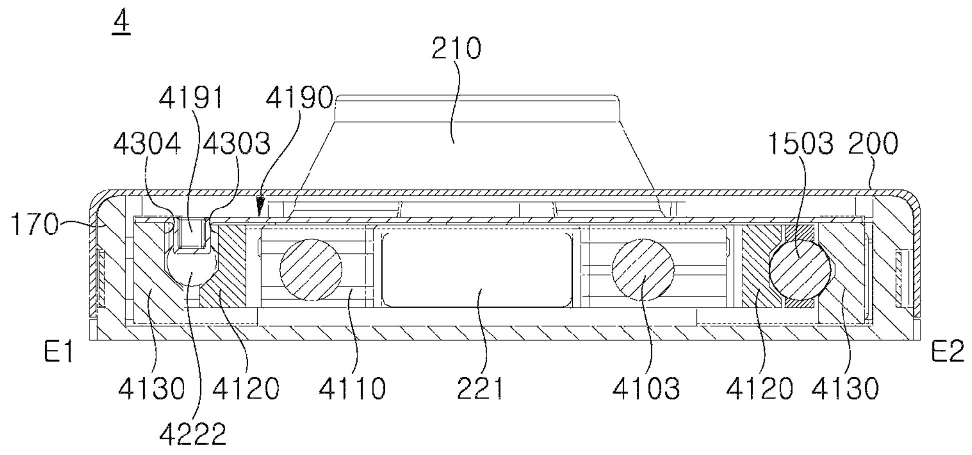
FIG. 30 is a third cross-sectional view (E1-E2) of the image shake correcting module according to the fourth embodiment of the present invention.

FIG. 22 is a view of the image shake correcting module according to the fourth embodiment of the present invention. More specifically, FIG. 22 is a front view of the image shake correcting module according to the fourth embodiment of the present invention, from which an outer cover and an inner cover are omitted. FIG. 23 is a view illustrating a first holder of the image shake correcting module according to the fourth embodiment of the present invention, on which a first assistant ball is mounted. FIG. 24 is a view illustrating a second holder of the image shake correcting module according to the fourth embodiment of the present invention. FIG. 25 is a view illustrating a third holder of the image shake correcting module according to the fourth embodiment of the present invention, on which a second assistant ball is mounted. FIG. 26 is a view illustrating an inner cover of the image shake correcting module according to the fourth embodiment of the present invention. FIG. 27 is a perspective view of the image shake correcting module according to the fourth embodiment of the present invention. FIG. 28 is a first cross-sectional view (C1-C2) of the image shake correcting module according to the fourth embodiment of the present invention. FIG. 29 is a second cross-sectional view (D1-D2) of the image shake correcting module according to the fourth embodiment of the present invention. FIG. 30 is a third cross-sectional view (E1-E2) of the image shake correcting module according to the fourth embodiment of the present invention.

The image shake correcting module 4 according to the fourth embodiment further includes assistant balls 4220 in addition to the components of the image shake 3 correction module according to the third embodiment (see FIG. 18 to FIG. 21).

The assistant balls 4220 may include a first assistant ball 4221 disposed between a first holder 4110 and a second holder 4120 and second assistant balls 4222 disposed between the second holder 4120 and a third holder 4130.

The assistant balls 4220 are adapted to prevent the first holder 4110 and the second holder 4120 from tilting in the vertical direction upon horizontal movement of the first holder 4110 and the second holder 4120 for correction of image shake.

To dispose the assistant balls 4220 between the first holder 4110 and the second holder 4120 and between the second holder 4120 and the third holder 4130, the first holder 4110, the second holder 4120 and the third holder 4130 may be formed with assistant ball-insertion portions.

The assistant ball-insertion portions 4301, 4302, 4303, 4303 may be formed on an inner or outer surface of the first to third holders 4110, 4120, 4130. The assistant ball-insertion portions 4301, 4302, 4303, 4303 are formed in a groove shape and have a structure bent at least once. More specifically, the assistant ball-insertion portions 4301, 4302, 4303, 4303 may have a structure in which a vertical groove open at an upper portion thereof and formed in the vertical direction is connected to a horizontal groove formed at a lower end of the vertical groove in the horizontal direction. For example, the assistant ball-insertion portions 4301, 4302, 4303, 4303 may be grooves having a "⌊" or "⌋" shape.

Referring to FIG. 23 to FIG. 25, the first holder 4110 may be formed with one first assistant ball-insertion portion 4301, the second holder 4120 may be formed with one second-1 ball-insertion portion 4302 and two second-2 assistant ball-insertion portions 4303, and the third holder 4130 may be formed with two third assistant ball-insertion portions 4304.

The first assistant ball-insertion portion 4301 may be formed on an outer surface of the fourth side surface of the first holder 4110. Here, the second-1 ball-insertion portion 4302 may be formed on an inner surface of the fourth side surface of the second holder 4120 to face the first assistant ball-insertion portion 4301. When the first holder 4110 is disposed inside the second holder 4120, the first assistant ball 4221 may be inserted into the vertical grooves of the first assistant ball-insertion portion 4301 and the second-1 ball-insertion portion 4302 through the open upper portions thereof to be secured in the horizontal grooves.

The second-2 assistant ball-insertion portions 4303 may be formed on an outer surface of the first side surface of the second holder 4120. In addition, the second-2 assistant ball-insertion portions 4303 may be formed at opposite sides of the first opening 1208 of the second holder 4120, respectively. Here, the third assistant ball-insertion portions 4304 may be formed on an inner surface of the first side surface of the third holder 4130 to face the second-2 assistant ball-insertion portions 4303. When the second holder 4120 is disposed inside the third holder 4130, the second assistant balls 4222 may be inserted into the second-2 assistant ball-insertion portions 4303 and the third assistant ball-insertion portions 4304 through the open upper portions thereof to be secured in the horizontal grooves.

Since the first assistant ball 4221 is securely fitted into the grooves in the first holder 4110 and the second holder 4120, it is possible to prevent the first holder 4110 from being at least partially tilted in the vertical direction. In addition, since the second assistant balls 4222 are securely fitted into the grooves in the second holder 4120 and the third holder 4130, it is possible to prevent the second holder 4120 from at least partially tilting in the vertical direction.

Referring to FIG. 26, the inner cover 4190 may further include second protrusions 4191 protruding downwards from a lower surface of the inner cover portion 1901. The second protrusions 4191 may be formed at locations corresponding to the assistant ball-insertion portions 4301, 4302, 4303, 4303.

When the inner cover 4190 is mounted on the housing 170, the second protrusions 4191 formed on the inner cover 4190 may be inserted into the vertical grooves of the assistant ball-insertion portions 4301, 4302, 4303, 4303. FIG. 28 shows a structure in which the second protrusion 4191 of the inner cover 4190 is inserted into the first assistant ball-insertion portion 4301 formed on the first holder 410.

Referring to FIG. 29, when the inner cover 4190 is mounted on the housing 170, some of the second protrusions 4191 formed on the inner cover 4190 may be inserted into a space between the vertical groove of the first assistant ball-insertion portion 4301 and the vertical groove of the second-1 ball-insertion portion 4302.

In addition, referring to FIG. 30, the other second protrusions 4191 may be inserted into spaces between the vertical grooves of the second-2 assistant ball-insertion portions 4303 and the vertical grooves of the third assistant ball-insertion portions 4304.

As such, the second protrusions 4191 may be fitted into the spaces between the grooves of the assistant ball-insertion portions 4301, 4302, 4303, 4304 formed on the first to third holders 4110, 4120, 4130 to block an outlet.

The second protrusions 4191 of the inner cover 4190 may prevent the assistant balls 4220 from moving out of the assistant ball-insertion portions 4301, 4302, 4303, 4303.

Although the image shake correcting module 4 according to the fourth embodiment further includes the assistant balls 4220 in addition to the components of the image shake correcting module 3 according to the third embodiment including the securing plate 220 and the drive ball cages 3141, 3151 (see FIG. 18 to FIG. 21), the image shake correcting module 4 according to the fourth embodiment may omit at least one of the drive ball cages 3141, 3151 and securing plate 220.

Although some embodiments have been described herein, it should be understood that these embodiments are given by way of illustration only and that various modifications, changes, and alterations can be made by those skilled in the art without departing from the spirit and scope of the present invention. Therefore, the scope of the invention should be limited only by the accompanying claims and equivalents thereto.

What is claimed is:

1. An image shake correcting module comprising:

an optical module;

a first holder having the optical module mounted therein, the first holder having side surfaces surrounding the optical module, an upper surface and a lower surface, the first holder having inner space open at upper and lower surfaces of the first holder;

a first drive unit comprising a first drive ball, a first magnet and a first coil for primary driving of the first holder;

a second holder having the first holder mounted therein such that the side surfaces of the first holder are surrounded by the second holder;

a second drive unit comprising a second drive ball, a second magnet, and a second coil for secondary driving of the second holder;

a third holder having the second holder mounted therein;

a housing having the third holder mounted therein;

an outer cover covering at least an upper portion of the housing and having an opening through which the optical module passes; and a substrate disposed on the housing and supplying electric current to the first coil and the second coil, wherein the primary driving comprises movement of the first holder in one horizontal direction, the secondary driving comprises movement of the second holder in another horizontal direction perpendicular to the one horizontal direction, and the first drive ball is placed on one of the side surfaces of the first holder and the second drive ball is placed on one side surface of the second holder, the one side surface of the second holder facing another of the side surfaces of the first holder adjacent to the one of the side surfaces of the first holder.

2. The image shake correcting module according to claim 1, wherein the first drive ball is placed between the first holder and the second holder.

3. The image shake correcting module according to claim 1, wherein the second drive ball is placed between the second holder and the third holder.

4. The image shake correcting module according to claim 1, wherein the first drive ball and the second drive ball are placed on a same horizontal surface.

5. The image shake correcting module according to claim 1, wherein the first drive ball is moved in the same horizontal direction as the first holder and the second drive ball is moved in a same horizontal direction as the second holder.

6. The image shake correcting module according to claim 1, wherein the first drive unit comprises:

the first magnet mounted on an outer surface of a first side surface of the first holder;

the first coil mounted on the substrate to face the first magnet; and the first drive ball disposed between a second side surface of the first holder and a second side surface of the second holder, the first side surface of the first holder is perpendicular to the second side surface of the first holder, and the second side surface of the first holder faces the second side surface of the second holder.

7. The image shake correcting module according to claim 6, wherein the first holder further comprises a first drive guide having an elongated groove shape formed on the second side surface of the first holder in the horizontal direction and the first drive ball is mounted on the first drive guide to rotate and move along the first drive guide.

8. The image shake correcting module according to claim 7, wherein the first holder is formed on the second side surface thereof with two first drive guides spaced apart from each other and parallel to each other in the horizontal direction, each of the two first drive guides being provided with the first drive ball.

9. The image shake correcting module according to claim 8, further comprising:

a first drive ball cage provided at opposite ends thereof with the two first drive balls, respectively, wherein the first drive balls rotate and move in a state of being fitted into the first drive ball cage.

10. The image shake correcting module according to claim 6, wherein the second drive unit comprises:

the second magnet mounted on an outer surface of a second side surface of the second holder;

the second coil mounted on the substrate to face the second magnet; and the second drive ball disposed between a third side surface of the second holder and a third side surface of the third holder, the second side surface of the second holder is perpendicular to the third side surface of the second holder, and the third side surface of the second holder faces the third side surface of the third holder.

11. The image shake correcting module according to claim 10, wherein the second holder further comprises a second drive guide having an elongated groove shape formed on the third side surface of the second holder in the horizontal direction and the second drive ball is mounted on the second drive guide to rotate and move along the second drive guide.

12. The image shake correcting module according to claim 11, wherein the second holder is formed on the third side surface thereof with two second drive guides spaced apart from each other and parallel to each other in the horizontal direction, each of the two second drive guides being provided with the second drive ball.

13. The image shake correcting module according to claim 12, further comprising:

a second drive ball cage provided at opposite ends thereof with the two second drive balls, respectively, wherein the second drive balls rotate and move in a state of being fitted into the second drive ball cage.

14. The image shake correcting module according to claim 10, further comprising:

a first securing plate disposed on the second side surface of the first holder, wherein the first securing plate and the second magnet face each other, with the second holder placed therebetween, and attractive force is generated between the first securing plate and the second magnet.

15. The image shake correcting module according to claim 10, further comprising:

a third drive unit comprising a third drive ball, a third magnet, and a third coil for tertiary driving of the third holder, wherein the tertiary driving comprises movement of the third holder in a vertical direction.

16. The image shake correcting module according to claim 15, wherein the third drive unit comprises:

the third magnet mounted on an outer surface of a third side surface of the third holder;

the third coil mounted on the substrate to face the third magnet; and the third drive ball disposed between the third holder and the housing, the third drive ball rotating while moving in the vertical direction.

17. The image shake correcting module according to claim 16, wherein the third holder further comprises a third drive guide having an elongated groove shape formed on the third side surface of the third holder in the vertical direction, and the third drive ball is mounted on the third drive guide to rotate and move along the third drive guide.

18. The image shake correcting module according to claim 16, wherein the third holder is formed on the third side surface thereof with two third drive guides spaced apart from each other and parallel to each other in the horizontal direction, and each of the two third drive guides is provided with the third drive ball.

19. The image shake correcting module according to claim 16, further comprising:

a second securing plate disposed on the third side surface of the second holder, wherein the second securing plate and the third magnet face each other, with the third holder placed therebetween, and attractive force is generated between the second securing plate and the third magnet.

20. The image shake correcting module according to claim 16, wherein the first holder, the second holder and the optical module are moved corresponding to movement of the third holder.

21. The image shake correcting module according to claim 1, wherein the first holder is moved corresponding to movement of the first holder.

22. The image shake correcting module according to claim 1, wherein the first holder and the optical module are moved corresponding to movement of the second holder.

23. The image shake correcting module according to claim 1, further comprising: assistant balls disposed between the first holder and the second holder and between the second holder and the third holder.

24. The image shake correcting module according to claim 23, further comprising: an assistant ball-insertion portion into which the assistant balls are inserted.

25. The image shake correcting module according to claim 24, wherein the assistant ball-insertion portion has a structure in which a vertical groove open at an upper portion thereof and formed in a vertical direction is connected to a horizontal groove formed at a lower end of the vertical groove in the horizontal direction.

26. The image shake correcting module according to claim 25, wherein the assistant balls are inserted into the assistant ball-insertion portion through the vertical groove to be mounted on the horizontal groove.

27. The image shake correcting module according to claim 24, wherein the assistant ball-insertion portion comprises:

a first assistant ball-insertion portion formed on an outer surface of the first holder;

a second-1 ball-insertion portion formed on an inner surface of the second holder to face the first assistant ball-insertion portion;

a second-2 assistant ball-insertion portion formed on an outer surface of the second holder; and a third assistant ball-insertion portion formed on an inner surface of the third holder to face the second-2 assistant ball-insertion portion.

* * * * *